US012715129B2

(12) United States Patent
Wang et al.

(10) Patent No.: US 12,715,129 B2
(45) Date of Patent: Aug. 25, 2026

(54) METHOD, APPARATUS, AND DEVICE FOR CONTROLLING LEGGED ROBOT, LEGGED ROBOT, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Shuai Wang, Shenzhen (CN); Yu Zheng, Shenzhen (CN); Qinqin Zhou, Shenzhen (CN); Wanchao Chi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 156 days.

(21) Appl. No.: 18/604,360

(22) Filed: Mar. 13, 2024

(65) Prior Publication Data

US 2024/0269846 A1 Aug. 15, 2024

Related U.S. Application Data

(63) Continuation of application No. PCT/CN2023/093507, filed on May 11, 2023.

(30) Foreign Application Priority Data

Jul. 25, 2022 (CN) ......................... 202210878214.3

(51) Int. Cl.

| | |
|---|---|
| ***B25J 13/08*** | (2006.01) |
| ***B25J 9/16*** | (2006.01) |
| ***B62D 57/032*** | (2006.01) |

(52) U.S. Cl.

CPC ............. *B25J 9/1664* (2013.01); *B25J 9/163* (2013.01); *B25J 9/1674* (2013.01); *B25J 13/085* (2013.01); *B25J 13/089* (2013.01); *B62D 57/032* (2013.01)

(58) Field of Classification Search

CPC ........ B25J 9/1664; B25J 9/163; B25J 9/1674; B25J 13/085; B25J 13/089; B25J 9/16; B25J 9/1602; B25J 9/1615; B62D 57/032

See application file for complete search history.

(56) References Cited

U.S. PATENT DOCUMENTS

| | | | | |
|---|---|---|---|---|
| 10,059,392 | B1 | 8/2018 | Fay et al. | |
| 2014/0100697 | A1 * | 4/2014 | Goulding | B25J 5/00 901/1 |

(Continued)

FOREIGN PATENT DOCUMENTS

| | | | |
|---|---|---|---|
| CN | 109693236 | A | 4/2019 |
| CN | 111913490 | A | 11/2020 |

(Continued)

OTHER PUBLICATIONS

Tencent Technology, WO, PCT/CN2023/093507, Jul. 25, 2023, 4 pgs.

(Continued)

*Primary Examiner* — Adam R Mott
*Assistant Examiner* — Heather J Keniry
(74) *Attorney, Agent, or Firm* — Morgan, Lewis & Bockius LLP

(57) ABSTRACT

This application provide a method for controlling the landing of a legged robot on a plane. The legged robot includes a base and at least two robotic legs, each leg including at least one joint. The method includes: determining a first expected moving trajectory and a second expected moving trajectory corresponding to the legged robot in response to (Continued)

determining that the legged robot is going to contact a plane, the first expected moving trajectory indicating an expected moving trajectory of a center of mass of the legged robot and an expected moving trajectory of a change in a tilt angle of the legged robot, and the second expected moving trajectory indicating an expected moving trajectory of a foot end of each robotic leg; and controlling, based on a dynamic model and the first and second moving trajectories, an action of each joint after the legged robot contacts the plane.

18 Claims, 10 Drawing Sheets

(56) References Cited

U.S. PATENT DOCUMENTS

| | | | | |
|---|---|---|---|---|
| 2018/0004208 | A1* | 1/2018 | Su | B25J 5/00 |
| 2021/0107150 | A1 | 4/2021 | Whitman et al. | |
| 2021/0171135 | A1* | 6/2021 | Blankespoor | G05D 1/245 |
| 2024/0051122 | A1* | 2/2024 | Deits | G05D 1/249 |
| 2024/0075998 | A1* | 3/2024 | Fay | B25J 9/1664 |

FOREIGN PATENT DOCUMENTS

| | | | |
|---|---|---|---|
| CN | 112207825 | A | 1/2021 |
| CN | 113524177 | A | 10/2021 |
| CN | 113753146 | A | 12/2021 |
| CN | 114137992 | A | 3/2022 |

OTHER PUBLICATIONS

Tencent Technology, Extended European Search Report, EP Patent Application No. 23844982.1, Jan. 23, 2025, 8 pgs.

Chuong Nguyen et al., "Contact-Timing and Trajectory Optimization for 3D Jumping on Quadruped Robots", IEEE/RSJ International Conference on Intelligent Robots and Systems (IROS), Oct. 2022, 7 pgs.

Se Hwan Jeon et al., "Online Optimal Landing Control of the MIT Mini Cheetah", International Conference on Robotics and Automation (ICRA), May 2022, 7 pgs.

Teng Chen et al., "Optimized Method for Planning and Controlling the Somersault Motion of Quadruped Robot", IEEE International Conference on Robotics and Automation (ICRA), May/Jun. 2021, 7 pgs.

Tencent Technology, Korean Office Action, KR Patent Application No. 10-2024-7006998, Jun. 24, 2025, 11 pgs.

Tencent Technology, ISR, PCT/CN2023/093507, Aug. 22, 2023, 2 pgs.

* cited by examiner

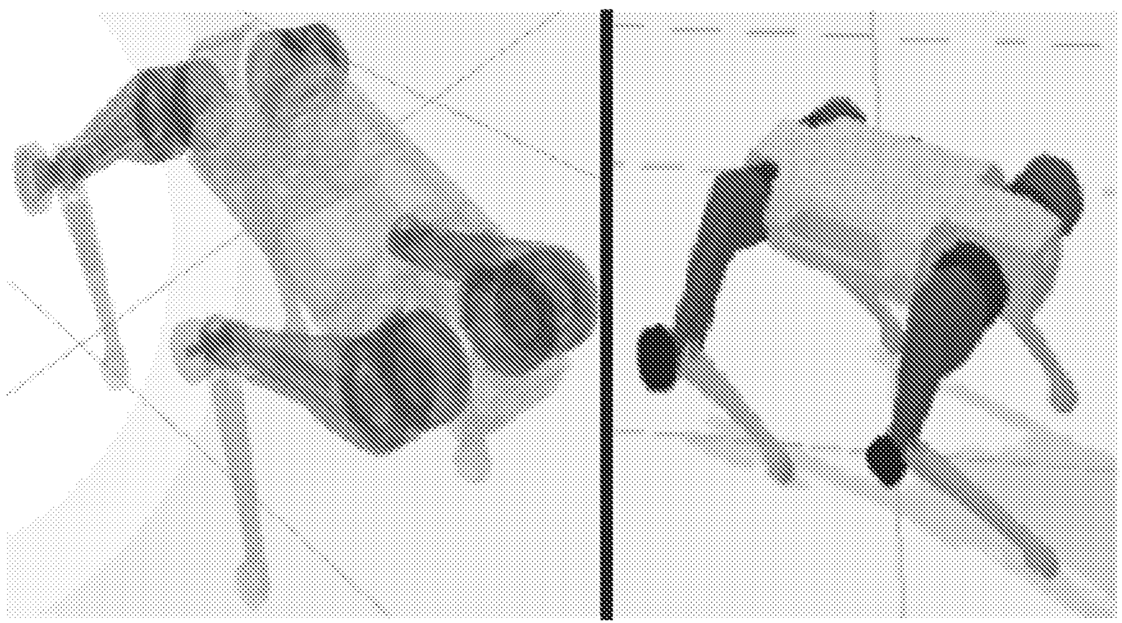

S201 — Determine a first expected trajectory and a second expected trajectory corresponding to a legged robot in response to determining that each robotic leg of the legged robot falls to contact a plane, the first expected trajectory indicating an expected trajectory of a center of mass of the legged robot moving in a direction of gravity and an expected trajectory of a change in a pitch angle of the legged robot, and the second expected trajectory indicating an expected trajectory of a foot end of each robotic leg

↓

S202 — Control, based on a dynamic model corresponding to the legged robot, the first expected trajectory, and the second expected trajectory, an action of each joint after the legged robot contacts the plane, until a height of a base of the legged robot is constant and a rotation angle in a direction of the pitch angle of the legged robot is zero

FIG. 2

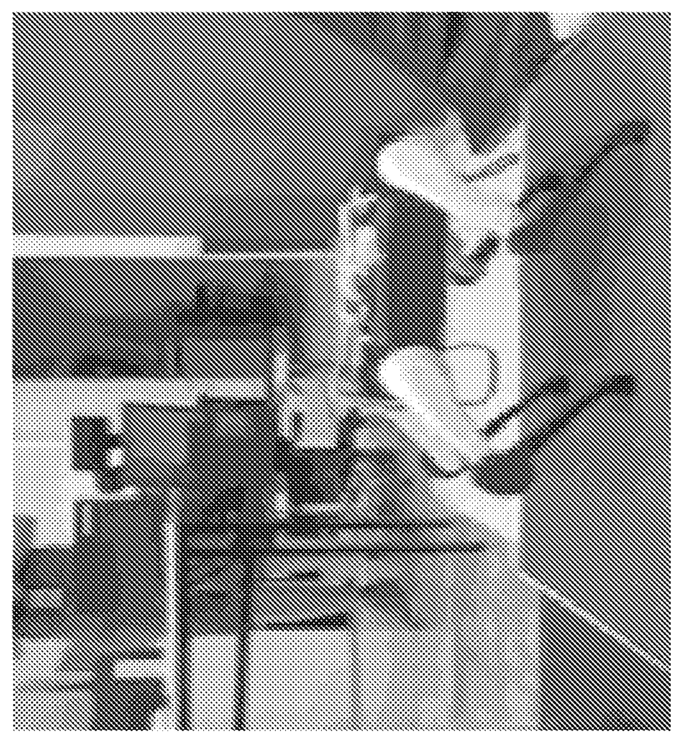
Stable moment
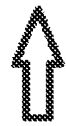
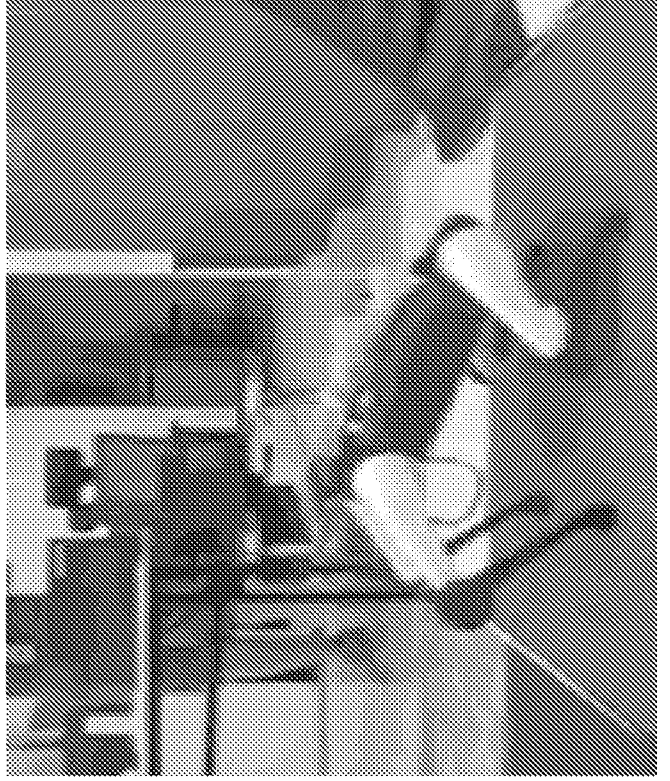
Initial moment
FIG. 5

METHOD, APPARATUS, AND DEVICE FOR CONTROLLING LEGGED ROBOT, LEGGED ROBOT, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2023/093507, entitled "METHOD, APPARATUS, AND DEVICE FOR CONTROLLING LEGGED ROBOT, LEGGED ROBOT, COMPUTER-READABLE STORAGE MEDIUM, AND COMPUTER PROGRAM PRODUCT" filed on May 11, 2023, which is based on and claims priority to Chinese Patent Application No. 202210878214.3, entitled "METHOD, APPARATUS, AND DEVICE FOR CONTROLLING LEGGED ROBOT, LEGGED ROBOT, COMPUTER-READABLE STORAGE MEDIUM, AND COMPUTER PROGRAM PRODUCT" filed on Jul. 25, 2022, all of which is incorporated herein by reference in its entirety.

This application relates to U.S. patent application Ser. No. 18/419,470, entitled "METHOD, APPARATUS, AND ELECTRONIC DEVICE FOR CONTROLLING LEGGED ROBOT, COMPUTER-READABLE STORAGE MEDIUM, COMPUTER PROGRAM PRODUCT, AND LEGGED ROBOT" filed on Jan. 22, 2024, which is incorporated herein by reference in its entirety.

FIELD OF THE TECHNOLOGY

This application relates to the field of legged robot technologies, specifically to the field of legged robot planning and control technologies, and in particular, to a method, an apparatus, and a device for controlling the landing of a legged robot on a plane, a legged robot, a computer-readable storage medium, and a computer program product.

BACKGROUND OF THE DISCLOSURE

With the wide application of artificial intelligence (AI) and legged robot technology in civilian and commercial fields, legged robots based on the AI and legged robot technology play an increasingly important role in fields such as intelligent transportation and smart home, and also face higher requirements.

At present, the legged robot (such as a quadruped robot) is capable of performing a plurality of different actions, for example, bounding and flipping. There is a lack of an effective control scheme to control the landing of the legged robot after performing these actions. As a result, the legged robot moves stiffly during the landing, each joint withstands an excessive impact force, and the body rebounds greatly. Even the legged robot is damaged due to the excessive impact force during landing.

In particular, the legged robot that performs the action of flipping is more prone to roll over because the body may have a larger tilt angle at a moment the legged robot contacts a plane, and a difference often exists in the moments a front leg and a rear leg contact the plane. Compared with the legged robot that performs an action of free landing, the legged robot that performs the action of flipping needs an effective control scheme to ensure stability of the legged robot during the landing.

SUMMARY

In view of the foregoing problems, embodiments of this application provide a method, an apparatus, and a device for controlling the landing of a legged robot on a plane, a legged robot, a computer-readable storage medium, and a computer program product.

An embodiment of this application provides a method for controlling the landing of a legged robot on a plane performed by a computer device, the legged robot including a base and at least two robotic legs, each of the robotic legs including at least one joint, and the method including: determining a first expected moving trajectory and a second expected moving trajectory corresponding to the legged robot in response to determining that each robotic leg of the legged robot is going to contact a plane, the first expected moving trajectory indicating an expected moving trajectory of a center of mass of the legged robot and an expected moving trajectory of a change in a tilt angle of the legged robot, and the second expected moving trajectory indicating an expected moving trajectory of a foot end of each robotic leg; and controlling, based on a dynamic model corresponding to the legged robot, the first expected moving trajectory, and the second expected moving trajectory, an action of each joint after the legged robot contacts the plane, until a height of the base of the legged robot reaches a constant and the tilt angle of the legged robot stops changing.

the tilt angle of the legged robot stops changing An embodiment of this application provides a legged robot, including: a base portion; a lower limb portion, connected to the base portion, the lower limb portion including four lower limbs, each of the lower limbs including a hip joint having two degrees of freedom and a knee joint having one degree of freedom; and a controller, arranged on the legged robot and configured to perform the foregoing method.

An embodiment of this application provides a computer device for controlling the landing of a legged robot on a plane, including: a processor; and a memory, having a computer-executable code stored therein, the computer-executable code, when executed by the processor, performing the foregoing method.

An embodiment of this application provides a non-transitory computer-readable storage medium, having an executable code stored therein, the executable code, when executed by a processor of a computer device, causing the computer device to perform the foregoing method.

In the embodiments of this application, a dynamic model is established for the legged robot in free-fall motion, the motion trajectory of the center of mass and the position trajectory of the foot end of the legged robot after landing are planned based on the dynamic model, and the control torque of each motor is solved based on the planned motion trajectory of the center of mass and the position trajectory of the foot end, to control the legged robot. Therefore, it is ensured that during the landing of the legged robot, each joint withstands only a small impact force, the body rebound is relatively small, a change in the tilt angle is relatively small, and a good anti-impact protection effect may be achieved on the legged robot while the landing function is ensured.

BRIEF DESCRIPTION OF THE DRAWINGS

To describe the technical solutions in embodiments of this application more clearly, the following briefly describes the accompanying drawings that need to be used in the description of the embodiments. Apparently, the accompanying drawings described below are merely some exemplary embodiments of this application, and a person of ordinary skill in the art may still derive other accompanying drawings from these accompanying drawings without creative efforts.

The following accompanying drawings are not intentionally scaled to an actual size, and emphasis is placed on showing the main idea of this application.

FIG. 1 is a schematic diagram of a legged robot according to an embodiment of this application.

FIG. 2 is a flowchart of a method for controlling the landing of a legged robot on a plane according to an embodiment of this application.

FIG. 5 is a schematic diagram showing contact between a robotic leg and a plane of a legged robot during landing according to an embodiment of this application.

DESCRIPTION OF EMBODIMENTS

Figure 3A:
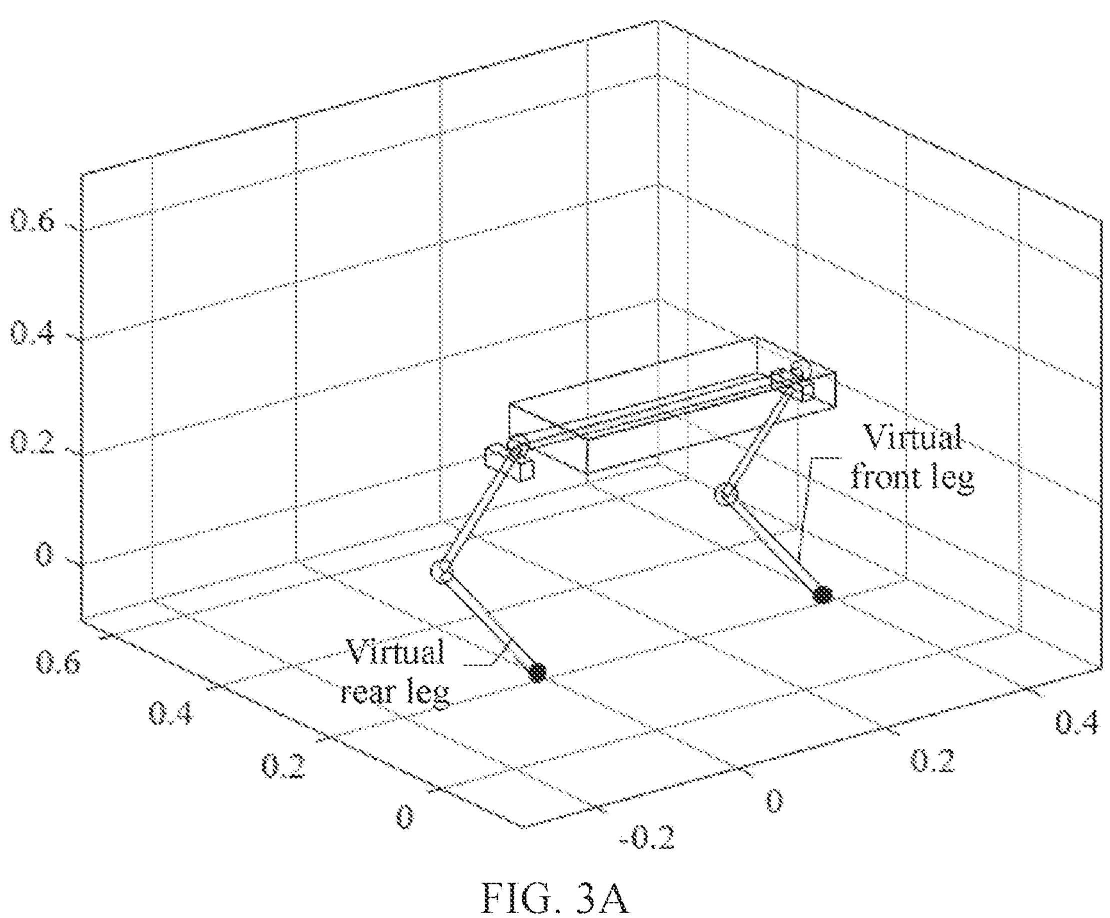
FIG. 3A is a schematic diagram of a virtual robot in a two-dimensional plane model obtained by simplifying a legged robot according to an embodiment of this application.

To make the objectives, technical solutions, and advantages of embodiments of this application clearer, the following describes exemplary embodiments according to this application in detail with reference to the accompanying drawings. Apparently, the described embodiments are merely some but not all of the embodiments of this application. It is to be understood that, this application is not limited by the exemplary embodiments described herein.

As shown in the embodiments of this application and claims, words such as "a/an", "one", "a kind", and/or "the" do not refer specifically to the singular and may also include the plural, unless the context clearly indicates an exception. In general, terms "comprise" and "include" merely indicate including clearly identified steps and elements. The steps and elements do not constitute an exclusive list, and a method or a device may also include other steps or elements.

Although the embodiments of this application make various references to some modules in an apparatus for controlling the landing of a legged robot on a plane in the embodiments of this application. However, any quantity of different modules may be used and run on a user terminal and/or a server. The modules are merely illustrative, and different aspects of the apparatus and the method may use different modules.

Flowcharts are used in the embodiments of this application to illustrate operations performed by the method and apparatus for controlling the landing of a legged robot on a plane. It is to be understood that, the foregoing or following operations are not necessarily strictly performed according to an order. On the contrary, various steps may be performed in reverse order or simultaneously as required. In addition, other operations may also be added to the processes. Alternatively, one or more operations may be deleted from the processes.

To facilitate description of the method and apparatus for controlling the landing of a legged robot on a plane provided in the embodiments of this application, the following introduces concepts related to the embodiments of this application.

The legged robot provided in the embodiments of this application is a robot that uses legs to move, which is biomimetically designed based on animals, to simulate motion patterns of the animals and replicate the motion capabilities of the animals based on engineering technology and scientific research achievements. The legged robot has strong adaptability to various environments (including a structured environment (such as a road, a railway, and a treated flat road surface) and an unstructured environment (such as a mountain land, a swamp, and a rugged road surface)), can adapt to various changes in a terrain and climb over relatively high obstacles, and can effectively reduce the load and improve energy utilization efficiency of a system. The legged robots may be divided into a monopod robot, a bipedal robot, a quadruped robot, a hexapod robot, an octopod robot, and the like based on quantities of feet. The quadruped robot has super athletic ability and higher static stability than the bipedal robot, and moves more simply and flexibly than the hexapod robot and the octopod robot. Therefore, the quadruped robot is a common choice for research on the legged robots. A gait of the quadruped robot refers to coordination among four legs in time and space in order for the quadruped robot to move continuously. The gait of the quadruped robot is derived from a gait of a quadruped mammal, which may include, but is not limited to, the following three simplified forms: walk, trot, and bound.

The method for controlling the landing of a legged robot on a plane provided in the embodiments of this application may be implemented based on artificial intelligence (AI). AI is a theory, a method, a technology, and an application system that uses a digital computer or a machine controlled by the digital computer to simulate, extend, and expand human intelligence, perceive the environment, acquire knowledge, and use the knowledge to obtain the best result. In other words, AI is a comprehensive technology of computer science, which attempts to understand essence of intelligence and produces a new intelligent machine that can respond in a manner similar to human intelligence. For example, in terms of the method for controlling the landing of a legged robot on a plane based on AI, a motion trajectory and a gait of the legged robot can be planned in a manner similar to that of guiding motion of a living animal by human, so that the motion of the legged robot is more flexible and bionic. Through research on design principles and implementation methods of various intelligent machines, AI enables the method for controlling the landing of a legged robot on a plane provided in the embodiments of this application to have the function of automatically and efficiently designing the subsequent motion trajectory and gait of the legged robot based on a current motion state of the legged robot.

Based on the above, the solutions provided in the embodiments of this application relate to technologies such as AI and machine learning. The method and apparatus for controlling the landing of a legged robot on a plane provided in the embodiments of this application are further described below with reference to the accompanying drawings.

FIG. 1 is a schematic diagram showing a legged robot according to an embodiment of this application. As shown in FIG. 1, a quadruped robot is used as an example. A left figure in FIG. 1 shows an internal perspective view of the exemplary legged robot, and a right figure shows an external structure diagram of the exemplary legged robot.

The exemplary legged robot may move based on four robotic legs. Each of the robotic legs may include a thigh and a calf, and each robotic leg may include at least one joint. For example, each robotic leg may include a plurality of lower limb joints, for example, a hip joint having two degrees of freedom and a knee joint having one degree of freedom.

In addition, each robotic leg may further be configured with a plurality of motors. The motors may be used individually or in combination to control two degrees of freedom of the hip joint and one degree of freedom of the knee joint of the quadruped robot. The legged robot may further be equipped with a variety of sensors, such as an inertial measurement unit (IMU) sensor and a joint angle encoder. The IMU sensor may provide an acceleration and pose information of the legged robot in real time. The joint angle encoder may provide joint angle information (such as an angle of the joint angle and an angular velocity feedback value) of each joint of the legged robot in real time.

The exemplary legged robot can perform an action such as flipping or bounding under the control of the plurality of motors mentioned above. However, the legged robot that performs these actions eventually falls back to the plane in the form of free landing. However, if the legged robot is not controlled during the free landing of the legged robot and the contact between the legged robot and the plane, the legged robot may perform the actions stiffly during the landing, each joint withstands an excessive impact force, and the body bounds greatly. Even in some extreme cases, due to the excessive impact force withstood by the legged robot during the landing, the legged robot is damaged.

Currently, some control schemes have been proposed in industry and academia to control the free fall process of the legged robot. For example, the process of the contact between each foot end of the quadruped robot and the plane is equivalent to an action process of two virtual springs in an x-axis direction and a z-axis direction. If a proportion differentiation (PD) control scheme is used to adjust stiffness and damping parameters of the virtual springs, an output torque of each joint motor can be derived equivalently, thereby enabling the legged robot to land dexterously. The robotic leg and the environment may be respectively equivalent to two different RLC models. Based on the two RLC models, a machine learning control scheme (data-driven) may be used to derive the output torque of each joint motor, thereby enabling the legged robot to land dexterously.

However, in such schemes, only establishment of a spring damping model based on a robotic leg model or an environmental model of the legged robot is considered, and neither a change in a linear velocity of the legged robot nor a change in an angular velocity of the center of mass of the legged robot is considered, which limits the control effect.

Therefore, in view of the foregoing problems, according to a first aspect, an embodiment of this application provides a method for controlling the landing of a legged robot on a plane. The legged robot includes a base and at least two robotic legs. Each of the robotic legs includes at least one joint. The method includes: determining a first expected moving trajectory and a second expected moving trajectory corresponding to the legged robot in response to determining that each robotic leg of the legged robot is going to contact a plane, the first expected moving trajectory indicating an expected moving trajectory of a center of mass of the legged robot moving in a direction of gravity and an expected moving trajectory of a change in a tilt angle of the legged robot, and the second expected moving trajectory indicating an expected moving trajectory of a foot end of each robotic leg; and controlling, based on a dynamic model corresponding to the legged robot, the first expected moving trajectory, and the second expected moving trajectory, an action of each joint after the legged robot contacts the plane, until a height of the base of the legged robot is constant and the tilt angle of the legged robot stops changing.

According to another aspect, an embodiment of this application further provides an apparatus for controlling the landing of a legged robot on a plane. The legged robot includes a base and at least two robotic legs. Each of the robotic legs includes at least one joint. The apparatus includes: a planning and calculation device, configured to determine a first expected moving trajectory and a second expected moving trajectory corresponding to the legged robot in response to determining that the legged robot is going to contact a plane, the first expected moving trajectory indicating an expected moving trajectory of a center of mass of the legged robot moving in a direction of gravity and an expected moving trajectory of a change in a tilt angle of the legged robot, and the second expected moving trajectory indicating an expected moving trajectory of a foot end of each robotic leg; and a control motor, configured to control, based on a dynamic model corresponding to the legged robot, the first expected moving trajectory, and the second expected moving trajectory, an action of each joint after the legged robot contacts the plane, until a height of the base of the legged robot is constant and the tilt angle of the legged robot stops changing.

According to still another aspect, an embodiment of this application further provides a legged robot, including: a base portion; a lower limb portion, connected to the base portion, the lower limb portion including four lower limbs, each of the lower limbs including a hip joint having two degrees of freedom and a knee joint having one degree of freedom; and a controller, arranged on the legged robot and configured to perform the foregoing method.

Compared with a conventional motion control scheme for the legged robot, according to the method for controlling the landing of a legged robot on a plane provided in the embodiments of this application, planning of trajectories and gaits of the legged robot can be automatically implemented, the impact force withstood by each joint can also be reduced during the landing of the legged robot, and the body rebound amplitude and a change amplitude of the tilt angle can be reduced, thereby achieving a good anti-impact protection effect on the legged robot while ensuring the landing function. In addition, in the embodiments of this application, a change in the tilt angle of the center of mass is further considered, which is more applicable to the landing control of the legged robot that performs the flipping action.

FIG. 2 is a flowchart of a method 20 for controlling the landing of a legged robot on a plane according to an embodiment of this application. The method 20 for controlling the landing of a legged robot on a plane provided in this embodiment of this application may include steps S201-

S202 as shown in FIG. 2. As described above, the legged robot includes a base and at least two robotic legs. Each of the robotic legs includes at least one joint.

In step S201, a first expected moving trajectory and a second expected moving trajectory corresponding to the legged robot are determined in response to determining that each robotic leg of the legged robot is going to contact a plane, the first expected moving trajectory indicating an expected moving trajectory of a center of mass of the legged robot moving in a direction of gravity and an expected moving trajectory of a change in a tilt angle of the legged robot, and the second expected moving trajectory indicating an expected moving trajectory of a foot end of each robotic leg.

As an example, step S201 may be performed by any computer device. The computer device herein may be a terminal or a server. Alternatively, the computer device herein may be both the terminal and the server, which is not limited. The terminal may be a smart phone, a computer (such as a tablet computer, a laptop, and a desktop computer), a smart wearable device (such as a smart watch and smart glasses), a smart voice interactive device, a smart home appliance (such as a smart television), an onboard terminal, an aircraft, or the like. The server may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a content delivery network (CDN), and a big data and artificial intelligence platform. Further, the terminal and the server may be located within or outside a blockchain network, which is not limited. Further the terminal and the server may also upload any data stored internally to the blockchain network for storage to prevent the data stored internally from being tampered with and improve data security.

For example, during falling of the legged robot, the contact status between each robotic leg of the legged robot and the plane (such as the ground and a tabletop) may change, so that the legged robot may have a plurality of motion patterns during the contact with the plane. In particular, during the falling of the legged robot that performs the action of flipping, the legged robot generally enters into contact with the plane at a tilt angle, and the legged robot may have an anterior-posterior tilt angular velocity or a lateral tilt angular velocity. In this case, a joint torque of each robotic leg needs to be dynamically adjusted to prevent the legged robot from falling.

Therefore, contact information of the contact between the legged robot and the plane needs to be determined, and the first expected moving trajectory and the second expected moving trajectory are determined based on a pose and state information of the robot at a moment when each robotic leg contacts the plane. An embodiment of how to determine the contact information of the contact between the legged robot and the plane is described later with reference to FIG. 3A to FIG. 3C.

As described above, the first expected moving trajectory indicates an expected moving trajectory of a center of mass of the legged robot moving in a direction of gravity and an expected moving trajectory of a change in a tilt angle of the legged robot. For example, the first expected moving trajectory may include expected position information, velocity information, acceleration information, angular velocity information, angular acceleration information, and the like of the center of mass of the legged robot at each time step. The first expected moving trajectory may be represented by a timing value sequence composed of information related to the center of mass corresponding to each time step. In some embodiments, each element in the timing value sequence may have 6 dimensions, respectively representing a position of the center of mass corresponding to a time step in an x-axis direction, a position of the center of mass in a y-axis direction, a position of the center of mass in a z-axis direction (direction of gravity), a pitch angle of the legged robot, a yaw angle of the legged robot, and a roll angle of the legged robot. Certainly, the first expected moving trajectory may alternatively be represented by another data structure, and the embodiments of this application are not limited thereto. An example scheme for determining the first expected moving trajectory is described later with reference to FIG. 4.

A foot end of each robotic leg is an end away from the base, and the second expected moving trajectory indicates an expected moving trajectory of the foot end of each robotic leg. For example, the second expected moving trajectory may include expected position information, velocity information, acceleration information, angular velocity information, angular acceleration information, and the like of the foot end of each robotic leg at each time step. For another example, the second expected moving trajectory may further include expected position information, velocity information, acceleration information, angular velocity information, angular acceleration information, and the like of each joint of each robotic leg at each time step. Similarly, the second expected moving trajectory may be represented by a timing sequence composed of information related to each robotic leg corresponding to each time step. Certainly, the second expected moving trajectory may alternatively be represented by another data structure, and the embodiments of this application are not limited thereto. An example scheme for determining the second expected moving trajectory is described later with reference to FIG. 5 and FIG. 6.

A time step may also be referred to as a frame. A time difference between adjacent time steps may be the same or different. For example, a change in the action and the force of the legged robot change dramatically during a period of time immediately after the legged robot comes into contact with the plane. Therefore, a difference between the time steps may be set to a small value less than a difference threshold, to ensure that the action control of the legged robot is flexible enough in the early stage. In a process of the legged robot gradually reaching a stable state, the difference between the time steps may be set to a large value greater than the difference threshold, to save computing power. The time difference between adjacent time steps is not limited in the embodiments of this application.

In step S202, an action of each joint after the legged robot contacts the plane is controlled based on a dynamic model corresponding to the legged robot, the first expected moving trajectory, and the second expected moving trajectory, until a height of the base of the legged robot is constant and the tilt angle of the legged robot stops changing.

The dynamic model corresponding to the legged robot is configured to represent a change relationship among each joint, an angle, an angular velocity, and an angular acceleration of the center of mass, the joint torque, and an external contact force during the motion of the legged robot. For example, the dynamic model may describe the foregoing change relationship from the perspective of an energy change. The dynamic model may also describe the foregoing change relationship from the perspective of a momentum change or a force change. This is not limited in the embodiments of this application.

In the process from a moment the legged robot is going to contact the plane to a moment the legged robot stands on the plane stably, an acting force withstood by the legged robot includes gravity, a driving force of each joint motor, and a contact force (also referred to as a support force) provided by the plane to the legged robot. Based on the three forces and information such as a size, a mass, a moment of inertia, a joint connection mode of each part of the body of the legged robot, the dynamic model corresponding to the legged robot is established. The contact force and the driving force withstood by the legged robots with different poses are different. The contact force between the legged robot and the plane at each time step is determined based on the dynamic model corresponding to the legged robot, so that the actual trajectory of the center of mass of the legged robot is consistent with the first expected moving trajectory.

In some embodiments, a motor torque provided by each joint motor at each time step may also be determined based on the dynamic model corresponding to the legged robot and the contact force between the legged robot and the plane at each time step, so that the trajectory of the foot end of each robotic leg is consistent with the second expected moving trajectory.

"Consistency" in the embodiments of this application means that during actual real machine testing, the actual trajectory of the center of mass of the legged robot is very close to or even the same as the first expected moving trajectory, and the trajectory of the foot end of each robotic leg is very close to or even the same as the second expected moving trajectory. Due to the limitation on the performance of the joint motor, the joint motor often cannot output ideal torque. In addition, considering a change in the external environment (for example, sudden occurrence of disturbances such as wind), it is often difficult to control the legged robot to fully follow the first expected moving trajectory and the second expected moving trajectory. Therefore, only the difference between the actual trajectory and the expected moving trajectory needs to be small enough in the embodiments of this application.

In some embodiments, the contact force required for the center of mass of the legged robot to reach the position, the velocity, the acceleration, the angular velocity, and the angular acceleration indicated by the first expected moving trajectory at each time step may be determined based on the dynamic model corresponding to the legged robot. The contact force is the support force provided by the plane to the foot end of each robotic leg. Further, joint control information required for the robotic leg of the legged robot to reach the pose indicated by the second expected moving trajectory at each time step may be further determined based on the dynamic model corresponding to the legged robot and the foregoing contact force.

In some embodiments, the joint control information may be either an acceleration of each joint motor or a torque of the joint motor. Although in a mathematical sense, the two physical quantities do not differ greatly as the control information for controlling rotation of the joint motor, in an actual physical system, not both of the physical quantities can be accurately measured. Therefore, the physical quantity having a better data test effect and consistent with the model may be selected for subsequent calculation based on a specific condition.

In the related art, the scheme for controlling the legged robot does not consider the planning of the trajectory of the center of mass of the legged robot, but only considers the spring model. Therefore, it is difficult to implement accurate control during the landing. In contrast, according to the method for controlling the landing of a legged robot on a plane provided in the embodiments of this application, planning of trajectories and gaits of the legged robot can be automatically implemented, the impact force withstood by each joint can also be reduced during the landing of the legged robot, and the body rebound amplitude and a change amplitude of the tilt angle can be reduced, thereby achieving a good anti-impact protection effect on the legged robot while ensuring the landing function. In addition, in the embodiments of this application, a change in the tilt angle of the center of mass is further considered, which is more applicable to the landing control of the legged robot that performs the flipping action.

Figure 3B:
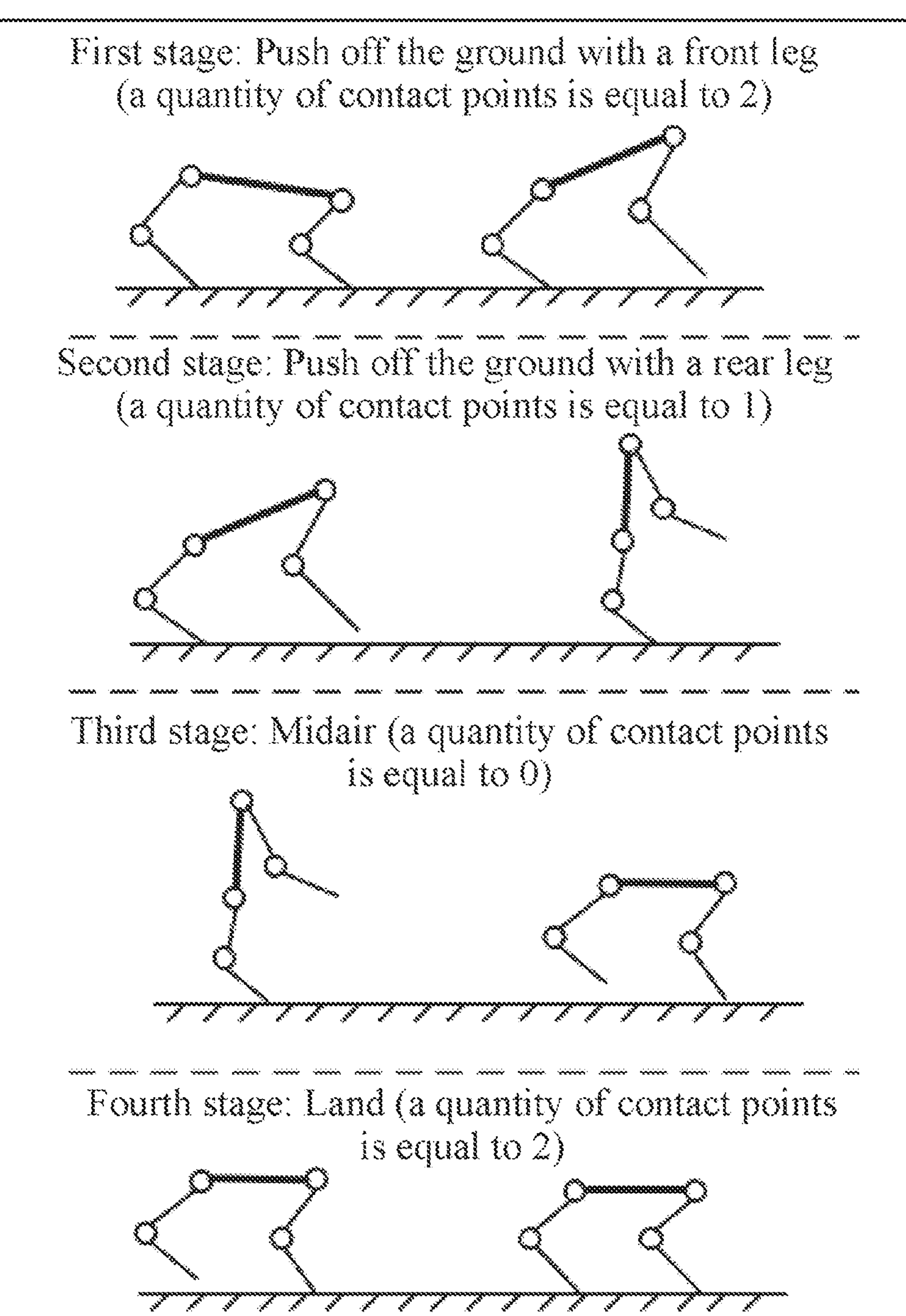
FIG. 3B is a schematic diagram of each stage of a legged robot according to an embodiment of this application during flipping.
Figure 3C:
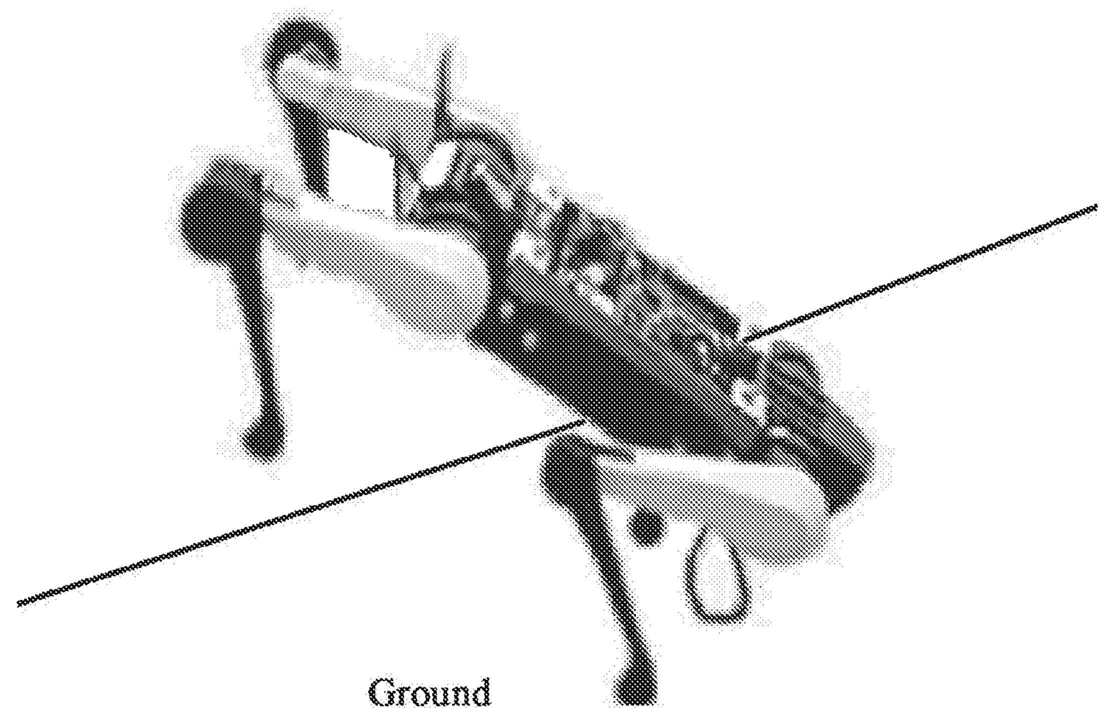
FIG. 3C is a schematic diagram of an instant a legged robot contacts a plane according to an embodiment of this application.

FIG. 3A is a schematic diagram of a virtual robot in a two-dimensional plane model obtained by simplifying a legged robot according to an embodiment of this application. FIG. 3B is a schematic diagram of each stage of a legged robot according to an embodiment of this application during flipping. FIG. 3C is a schematic diagram of an instant a legged robot contacts a plane according to an embodiment of this application.

Referring to FIG. 3A, it may be approximately considered that the legged robot moves in a two-dimensional plane (a plane formed by an x-axis (a horizontal axis) and a z-axis (a vertical axis)). If a mass and asymmetry of shape of the legged robot and a control error of a motor are not considered, the legged robot may be simplified into a virtual robot in a two-dimensional plane model, to perform control and state estimation on the virtual robot. The virtual robot may include a virtual front leg and a virtual rear leg. The virtual front leg is obtained by performing equivalent processing on two front legs of the legged robot in FIG. 1. The virtual front leg may be obtained by overlapping the front robotic legs on left and right sides of a quadruped robot. The virtual rear leg is obtained by performing equivalent processing on two rear legs of the legged robot. The virtual rear leg may be obtained by overlapping the rear legs on the left and right sides of the legged robot.

FIG. 3B shows four stages of a backflip action performed by the legged robot.

In a first stage, the virtual front leg and the virtual rear leg of the virtual robot simultaneously contact the plane. The whole process includes a process in which the virtual robot uses the virtual rear leg as a position point and the virtual front leg exerts force to push off the ground. The virtual robot withstands a reaction force of the plane. In a next stage, the virtual front leg leaves the plane, and only the virtual rear leg contacts the plane. The stage ends at an instant the virtual front leg leaves the plane. In the first stage, a quantity of virtual contact points between the virtual robot and the plane in the two-dimensional plane model is 2, including a virtual contact point between the virtual front leg and the plane and a virtual contact point between the virtual rear leg and the plane.

A second stage starts from the instant the virtual front leg of the virtual robot leaves the plane, until the virtual front leg and the virtual rear leg of the virtual robot simultaneously leave the plane. The whole process includes a process in which the virtual robot rotates around the contact point between the virtual rear leg and the plane. In the second stage, a quantity of virtual contact points between the virtual robot and the plane in the two-dimensional plane model is 1, including the virtual contact point between the virtual rear leg and the plane.

A third stage starts from an instant the virtual front leg and the virtual rear leg of the virtual robot simultaneously leave the plane, until one or more legs of the virtual robot contact the plane. A process of rotating a pose of the center of mass of the virtual robot in the air by approximately 360 degrees is included. In the third stage, a quantity of virtual contact points between the virtual robot and the plane in the two-dimensional plane model is 0.

A fourth stage starts from an instant the virtual front leg of the virtual robot contacts the plane, until the virtual front leg and the virtual rear leg of the virtual robot both fall onto the plane and then gradually stabilize. In the fourth stage, after the virtual front leg and the virtual rear leg both fall onto the ground, a quantity of virtual contact points between the virtual robot and the plane in the two-dimensional plane model is 2, including the virtual contact point between the virtual front leg and the plane and the virtual contact point between the virtual rear leg and the plane.

The method for controlling the landing of a legged robot on a plane provided in the embodiments of this application is mainly applied to the process in which the virtual front leg and the virtual rear leg both fall onto the plane and then gradually stabilize in the fourth stage. Referring to FIG. 3C, to achieve landing buffer, contact information between each robotic leg and the plane at a current moment needs to be determined, and it is determined, based on the contact information, whether to start calculating a first expected moving trajectory and a second expected moving trajectory. The current moment is a most recent system moment as time progresses during landing of the legged robot. For example, the contact information between each robotic leg and the plane at the current moment includes at least one of the following: information such as whether each robotic leg of the legged robot contacts the plane, an included angle formed between each robotic leg and the plane, a quantity of contact points between each robotic leg and the plane, a position of each contact point, a quantity of virtual contact points between the virtual robot and the plane, and a position of the virtual contact point, to determine the first expected moving trajectory and the second expected moving trajectory of the legged robot.

In some embodiments, the contact information is determined by current state information corresponding to the legged robot at the current moment.

Figure 8:
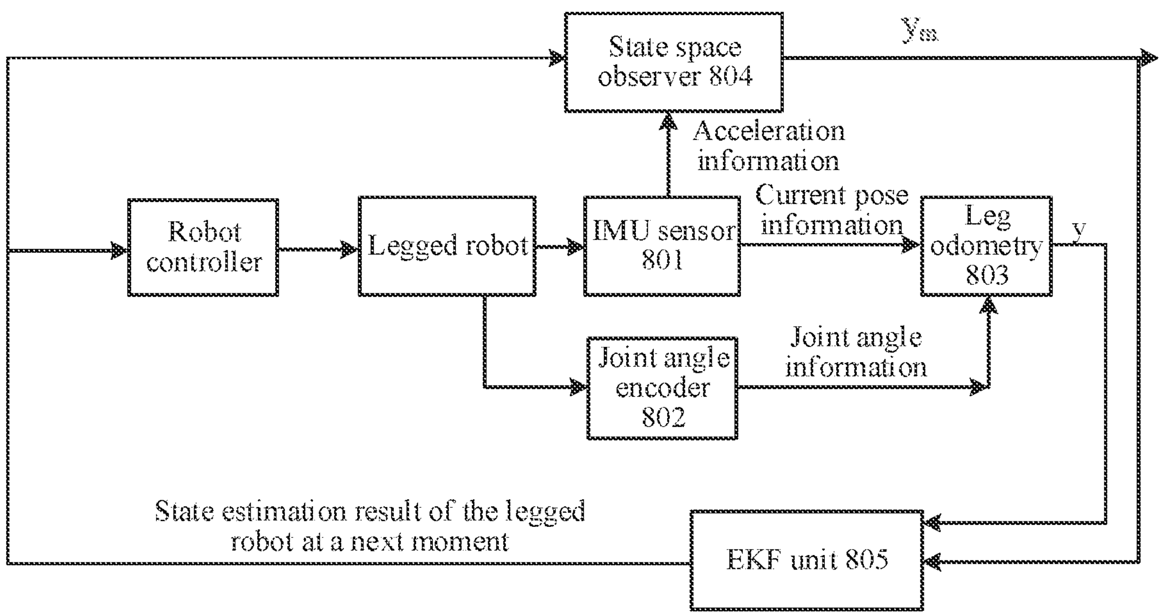
FIG. 8 is a schematic diagram showing a control system architecture of a legged robot according to an embodiment of this application.

In some embodiments, referring to FIG. 8, an IMU sensor 801 in the legged robot may be invoked to determine the current state information of the legged robot. For example, acceleration information (the acceleration information may include accelerations of the legged robot in a plurality of directions (such as a vertical direction and a horizontal direction)) of the legged robot at the current moment and current pose information may be collected by using the IMU sensor 801, and a joint angle encoder 802 is invoked to determine joint angle information (such as an angle of a joint angle and an angular velocity feedback value) of each joint of the legged robot at the current moment. Next, the current pose information and the joint angle information (such as the angle of the joint angle and the angular velocity feedback value) may be inputted into a leg odometry 803 to calculate position information. The position information may include a position of each robotic leg of the legged robot at the current moment. In addition, the acceleration information may be inputted into a state space observer 804, so that the state space observer 804 may output a position observation result based on the acceleration information and a historically obtained state estimation result of the legged robot at the current moment. The position observation result may include an observed position of each robotic leg of the legged robot at the current moment. The state estimation result of the legged robot at the current moment may be obtained by estimating a state of the legged robot at the current moment when a previous moment of the current moment arrives, which may be stored in a vector or another data structure, which is not limited. Then a state of the legged robot at a next moment of the current moment may be estimated based on the position information and the position observation result.

For example, the position information and the position observation result may also be used as input data of an extended Kalman filter (EKF) unit 805, to perform state estimation through the EKF unit, thereby obtaining the state estimation result of the legged robot at the next moment. The so-called EKF is an extended form of a standard Kalman filter (a Kalman filter for short) in a nonlinear situation, in which linearization of a nonlinear function is implemented by performing Taylor expansion on the nonlinear function, omitting a higher-order term, and retaining a first-order term of an expansion term. In some embodiments, the position information and the position observation result may alternatively be used as input data of the Kalman filter unit or input data of the state estimation model obtained based on machine learning, to perform state estimation through the Kalman filter unit or the state estimation model, to obtain the state estimation result of the legged robot at the next moment. The state estimation result of the legged robot at the next moment may be used for both control of the legged robot and the input of the state space observer during the next state estimation. In other words, the state estimation result obtained through the state estimation may be used for feedback control of the legged robot to form a closed loop.

The foregoing are merely some examples of obtaining the current state information. In the embodiments of this application, a scheme for obtaining the current state information is further described with reference to FIG. 8. Several implementations of how to determine the contact information based on the current state information of the legged robot are described below.

Because any state value corresponding to the robotic leg may be subject to a sudden change when the contact information between the robotic leg and the plane changes, the contact information between the robotic leg and the plane at the current moment may be determined through the current state value of the robotic leg. In some embodiments, the manner of determining the contact information based on the current state information includes: obtaining a historical state value of any robotic leg at a previous moment of a current moment, and determining a current state value of any robotic leg from the current state information, so that it may be determined, based on the historical state value, whether a sudden change to the current state value of any robotic leg occurs.

In the embodiments of this application, the sudden change existing in the current state value means that a difference between the current state value and the historical state value is greater than a preset difference. Based on this, a difference between the historical state value and any current state value may be calculated. If the calculated difference is greater than the preset difference, it is determined that a sudden change to the current state value occurs. If the calculated difference is greater than the preset difference, it is determined that the sudden change does not exist in the current state value. For example, the historical state value is set to 20, and the preset difference is set to 50. If the current state value is 100, it may be considered that a sudden change to the current state value occurs because 100 minus 20 is equal to 80 and 80 is greater than 50. If the current state value is 30, it may be considered that no sudden change to the current state value occurs because 30 minus 20 is equal to 10 and 10 is less than 50.

If it is determined, based on the historical state value, that a sudden change to the current state value of any robotic leg occurs, and the current state value of the robotic leg is greater than the historical state value, it is determined that the robotic leg contacts the plane at the current moment. If it is determined, based on the historical state value, that no sudden change to the current state value of any robotic leg occurs, the contact information between the robotic leg and the plane at the previous moment is used as the contact information of the current moment. In other words, if any robotic leg contacts the plane at the previous moment, it is determined that the robotic leg also contacts the plane at the current moment. If any robotic leg does not contact the plane at the previous moment, it is determined that the robotic leg does not contact the plane at the current moment.

For example, in some embodiments, the current state information may include a joint motor torque or a current value or a voltage value of each robotic leg.

Generally, when the robotic leg of the legged robot does not contact the plane (for example, the robotic leg does not contact the ground) and is suspended in the air, the load of the robotic leg is only a mass of the robotic leg. Because the mass of the robotic leg of the legged robot is negligible with respect to an overall mass, a smaller load leads to a smaller feedback current value of each joint and a smaller joint motor torque. When the robotic leg of the legged robot contacts the plane (for example, the robotic leg contacts the ground), the load of the legged robot becomes its total mass plus an equivalent inertial force of moving downward under the action of inertia thereof. Therefore, a larger load leads to a larger feedback current value of each joint and a larger joint motor torque. Based on this, when a sudden change in the joint motor torque or the feedback current value from being small to large is detected, it is considered that the legged robot lands from the air to the plane (such as the ground).

For another example, in some embodiments, the current state information includes a height of the center of mass and a pose of the center of mass of the legged robot, and current joint angle information corresponding to each robotic leg.

In some embodiments, a moment the foot end of the legged robot contacts the plane may be determined based on the height of the center of mass and the pose of the center of mass of the legged robot detected by an external vision or motion capture system and the joint angle information of the legged robot, to determine whether the corresponding robotic leg contacts the plane at the current moment.

The manner of detecting the contact information between the robotic leg and the plane at the current moment based on the current state information includes: calculating a height of any robotic leg from the plane based on the height of the center of mass, the pose of the center of mass, and the current joint angle information corresponding to any robotic leg; determining that any robotic leg contacts the plane at the current moment if the calculated height is less than or equal to a height threshold (such as a numerical value 0 or 0.005); and determining that any robotic leg does not contact the plane at the current moment if the calculated height is greater than the height threshold.

For another example, in some embodiments, the current state information may include a current plantar tactile feedback value corresponding to each robotic leg, the plantar tactile feedback value being generated by using a plantar tactile sensor of the corresponding leg.

In some embodiments, it may be determined, by using the plantar tactile sensor, whether the corresponding leg contacts the plane at the current moment. In addition, when any plantar tactile sensor detects that the corresponding leg contacts the plane, a first numerical value is generated as the plantar tactile feedback value, and when it is detected that the corresponding leg does not contact the plane, a second numerical value is generated as the plantar tactile feedback value. The first numerical value and the second numerical value herein may be set based on actual needs. For example, the first numerical value is set to a numerical value 1, and the second numerical value is set to a numerical value 0, or the first numerical value is set to the numerical value 0, and the second numerical value is set to the numerical value 1. The manner of detecting the contact information between the robotic leg and the plane at the current moment based on the current state information includes: obtaining the current plantar tactile feedback value corresponding to the robotic leg from the current state information; determining that any robotic leg contacts the plane at the current moment if the obtained current plantar tactile feedback value is the first numerical value; and determining that any robotic leg does not contact the plane at the current moment if the obtained current plantar tactile feedback value is the second numerical value.

In some embodiments, the current state information includes: a current acceleration of the legged robot in the vertical direction. It is assumed that at the previous moment of the current moment, a historical acceleration of the legged robot in the vertical direction is known. If it is determined, based on the historical acceleration, that a sudden change to the current acceleration occurs, it is determined that the legged robot has landed.

Practice shows that when the legged robot stably stands on the plane, the acceleration of the legged robot in a direction z collected by the IMU sensor is twice a numerical value g of an acceleration of gravity. When the legged robot is completely weightless in the air, the acceleration of the legged robot in the direction z collected by the IMU sensor is close to 0. In both a process in which the legged robot steps hard on the plane before preparing to lift, and a process in which the legged robot buffers toward the plane after landing, the acceleration of the legged robot in the direction z collected by the IMU sensor is greater than twice the acceleration of gravity g. It may be learned accordingly that at a moment the legged robot lands, a sudden change to the acceleration of the legged robot in the vertical direction occurs.

In the embodiment, a sudden change to the current acceleration means that a difference between the current acceleration and the historical acceleration is greater than a difference threshold. Based on this, the computer device may calculate the difference between the historical acceleration and the current acceleration. If the calculated difference is greater than the difference threshold, it is determined that a sudden change to the current acceleration occurs. If the calculated difference is not greater than the difference threshold, it is determined that no sudden change to the current acceleration occurs. For example, the historical acceleration is set to 2, and the difference threshold is set to 5. If the current acceleration is 9, then it may be considered that a sudden change to the current acceleration occurs because 9 minus 2 is equal to 7 and 7 is greater than 5. If the current acceleration is 4, then it may be considered that no sudden change to the current acceleration occurs because 4 minus 2 is equal to 2 and 2 is less than 5.

It is to be understood that the foregoing only illustrates some implementation processes of determining the contact information of the robotic leg by using examples, and is not exhaustive. The embodiments of this application are not limited thereto.

Figure 4:
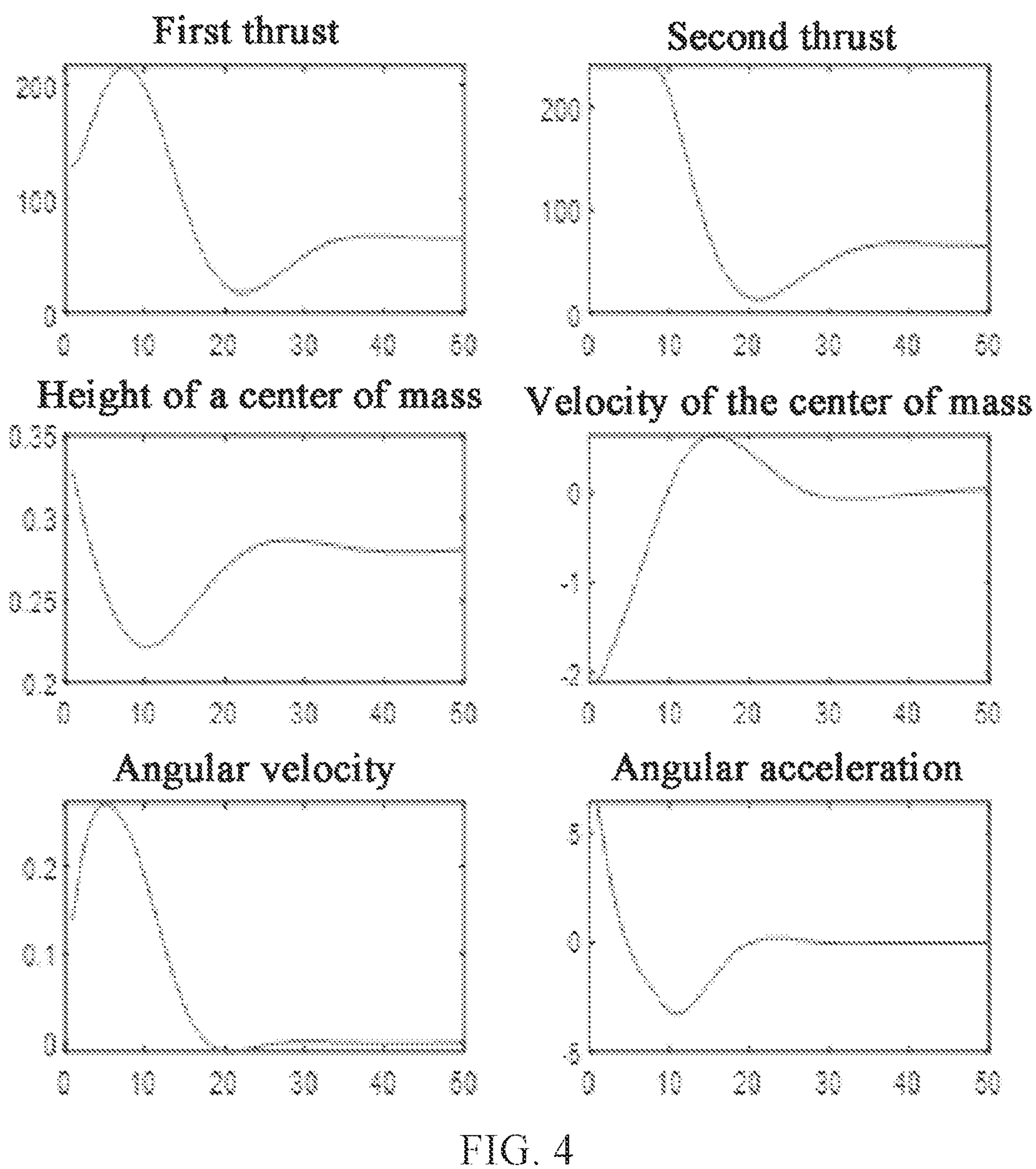
FIG. 4 is a schematic diagram showing changes in a position and a pose of a center of mass of a legged robot during landing and a force situation of a front leg and a rear leg in a simplified model of the legged robot according to an embodiment of this application.

Next, how to determine the first expected moving trajectory of the legged robot is described with reference to FIG. 4. FIG. 4 is a schematic diagram of changes in a position and a pose of a center of mass of a legged robot during landing and a force situation of a front leg and a rear leg in a simplified model of the legged robot according to an embodiment of this application.

Six curves are shown in FIG. 4, which are respectively a first thrust curve, a second thrust curve, a height curve of the center of mass, a velocity curve of the center of mass, a tilt angle curve, and an angular velocity curve. The six curves correspond to the first expected moving trajectory. The six curves have the same initial condition. An initial height at a landing moment is 0.35 m, an initial velocity at the landing moment is −2.3 m/s, a final height at a stable moment is 0.28 m, a tilt angle at the landing moment is 0.05 rad, an angular velocity of a tilt angle of a landing moment is 9 rad/s, an upper limit of an impact force withstood at the landing moment is 240 N, and an upper limit of the impact force withstood in the whole process is 240 N.

The first thrust curve indicates a change of thrust of the front leg of the legged robot during the landing with a time step. The x-axis represents the time step, and the y-axis represents a thrust magnitude of first thrust f1 (in newtons). As shown in the first thrust curve, after the legged robot contacts the plane, the thrust of the front leg of the legged robot first gradually increases, then gradually decreases, and then gradually increases to a stable value.

The second thrust curve indicates a change of thrust of the rear leg of the legged robot during the landing with the time step. The x-axis represents the time step, and the y-axis represents a thrust magnitude of second thrust f2 (in newtons). As shown in the second thrust curve, after the rear leg of the legged robot contacts the plane, the thrust of the rear leg maintains the maximum value for a period of time and gradually decreases, and then gradually rises to a stable value.

The height curve of the center of mass indicates a change of the height of the center of mass with the time step during the landing of the legged robot. The x-axis represents the time step, and the y-axis represents the height (in centimeters). The curve exemplarily shows a change of the first expected moving trajectory in the direction z. As shown in the height curve of the center of mass, after the legged robot contacts the plane, the height of the center of mass of the legged robot gradually decreases and then gradually increases.

The velocity curve of the center of mass indicates a change of the velocity of the center of mass of the legged robot during the landing in the direction of gravity (the direction z) with the time step. The x-axis represents the time step, and the y-axis represents the velocity (in meters per second). The curve exemplarily shows the velocity change of the first expected moving trajectory in the direction z. As shown in the velocity curve, after the legged robot contacts the plane, the height of the center of mass of the legged robot in the vertical direction gradually increases and then gradually decreases to 0.

The tilt angle curve indicates a change of the tilt angle with the time step during the landing of the legged robot. The x-axis represents the time step, and the y-axis represents the tilt angle (in radians). The curve exemplarily shows the change of the tilt angle in the first expected moving trajectory. As shown in the tilt angle curve, after the legged robot contacts the plane, the angle value of the tilt angle of the legged robot gradually increases and then gradually decreases to 0.

The angular velocity curve indicates the change of the tilt angle with the time step during the landing of the legged robot. The x-axis represents the time step, and the y-axis represents the angular velocity of the tilt angle (in radians per second). The curve exemplarily shows the angular velocity change in the tilt angle in the first expected moving trajectory. As shown in the angular velocity curve, after the legged robot contacts the plane, the angular velocity of the tilt angle of the legged robot gradually decreases to 0, then increases in an opposite direction, and then gradually decreases to 0.

As shown in FIG. 4, the legged robot first falls at a relatively large acceleration until any front leg contacts the plane. In this case, the robotic leg in contact with the plane withstands a larger acting force applied by the plane, and the velocity at which the center of mass falls gradually decreases. As four robotic legs contact the plane in sequence, the four robotic legs together withstand the acting force applied to the legged robot by the plane, and always maintain the contact with the plane until the center of mass of the legged robot reaches an expected resting height and the angle of the tilt angle is around 0.

Based on this, to implement the buffer effect of the legged robot during the landing and reduce the body rebound amplitude of the legged robot, an optimization objective may be set based on the height curve of the center of mass and the tilt angle curve in FIG. 4, so that the expected moving trajectory achieves the expected buffer effect as far as possible. For example, the optimization objective may be small overshoot, small integral of the change of the tilt angle with time, small integral of the height in the vertical direction with time, a minimum height being greater than a safety threshold, no sudden change to force, the change velocity of the height in the vertical direction satisfying a constraint, and the like.

In some embodiments, an approximate model corresponding to the legged robot may be used to determine the expected moving trajectory of the center of mass of the legged robot (that is, the first expected moving trajectory). In the approximate model, it may be approximately considered that the legged robot is a single rigid body, and during the contact between the legged robot and the plane, the front leg applies first thrust to the single rigid body, the rear leg applies second thrust to the single rigid body, a resultant force of the first thrust and the second thrust applies upward thrust to the single rigid body, and a torque formed by the first thrust and the second thrust provides an angular acceleration of the center of mass for the single rigid body.

In some embodiments, during implementation of "determining the first expected moving trajectory corresponding to the legged robot based on an approximate model corresponding to the legged robot", a mass of the legged robot is first obtained. A dynamic equation corresponding to the legged robot is determined based on the approximate model and the mass of the legged robot. Then the dynamic equation is transformed into a state space representation, and the state space representation is discretized, to obtain a state transition equation corresponding to each time step. An optimized objective function is constructed by using the state transition equation corresponding to each time step, and the optimized objective function is solved to obtain the first expected moving trajectory corresponding to the legged robot.

For example, it may be approximately considered that the legged robot is a single rigid body having a mass of m and a moment of inertia in a direction of rotation around a rotation axis corresponding to the tilt angle of I. In a case that the legged robot has four robotic legs, a resultant force of two front legs is f1, a resultant force of two rear legs is f2, and a sum of the two resultant forces forms upward thrust on the single rigid body. Based on such an approximate model, a first equation (1) may be determined according to the Newton's second law and Euler's formula. The first equation is also referred to as a dynamic equation. In some embodiments, the dynamic model is at least partially based on the approximate model, the dynamic model indicates a relationship between an acceleration of the single rigid body and the first thrust, the second thrust, and the gravity, and the dynamic model further indicates a relationship between an angular acceleration of the rotation angle in the direction of the tilt angle of the single rigid body and the first thrust and the second thrust.

$$\begin{aligned} f_1 + f_2 + mg &= m\ddot{x} \\ (f_1 l - f_2 l)\cos(\theta) &= I\ddot{\theta} \end{aligned} \tag{1}$$

where a positive direction is vertically upward, and g is a gravity coefficient, which is equal to −9.81 (a negative sign indicates that a direction of gravity is vertically downward). l is a length of the robotic leg. $\ddot{x}$ indicates an acceleration of the center of mass of the single rigid body in the vertical direction. $\ddot{\theta}$ indicates an angular acceleration of a rotation angle in the direction of the tilt angle of the single rigid body. θ indicates an angle value of the rotation angle in the direction of the tilt angle of the single rigid body.

The dynamic equation is transformed into a form of a state space representation, which is a second equation (2) shown below.

$$\begin{bmatrix} \dot{x} \\ \ddot{x} \\ \dot{g} \\ \dot{\theta} \\ \ddot{\theta} \end{bmatrix} = \begin{bmatrix} 0 & 1 & 0 & 0 & 0 \\ 0 & 0 & 1 & 0 & 0 \\ 0 & 0 & 0 & 0 & 0 \\ 0 & 0 & 0 & 0 & 1 \\ 0 & 0 & 0 & 0 & 0 \end{bmatrix} \begin{bmatrix} x \\ \dot{x} \\ g \\ \theta \\ \dot{\theta} \end{bmatrix} + \begin{bmatrix} 0 & 0 \\ \frac{1}{m} & \frac{1}{m} \\ 0 & 0 \\ 0 & 0 \\ \frac{l\cos(\theta)}{I} & -\frac{l\cos(\theta)}{I} \end{bmatrix} \begin{bmatrix} f_1 \\ f_2 \end{bmatrix} \tag{2}$$

The second equation (2) may be abbreviated to a form of a third equation (3).

$$\dot{x} = A_c x + B_c u \tag{3}$$

where $$A_c = \begin{bmatrix} 0 & 1 & 0 & 0 & 0 \\ 0 & 0 & 1 & 0 & 0 \\ 0 & 0 & 0 & 0 & 0 \\ 0 & 0 & 0 & 0 & 1 \\ 0 & 0 & 0 & 0 & 0 \end{bmatrix},$$

and

-continued $$B_c = \begin{bmatrix} 0 & 0 \\ \frac{1}{m} & \frac{1}{m} \\ 0 & 0 \\ 0 & 0 \\ \frac{l\cos\theta}{I} & -\frac{l\cos\theta}{I} \end{bmatrix}.$$

Correspondingly, the third equation (3) is discretized based on the time step (a length of the time step is Δt), and a fourth equation (4) may be obtained.

$$x_{i+1} = \dot{x}_i\Delta t + x_i = (A_c x_i + B_c u_i)\Delta t + x_i = (A_c\Delta t + I)x_i + B_c\Delta t u_i \tag{4}$$

Let $A_d = A_c\Delta t + I$, and $B_d = B_c\Delta t$. Based on model predictive control (MPC), a fifth equation (5) may be obtained.

$$\begin{bmatrix} x_1 \\ x_2 \\ x_3 \\ \vdots \\ x_k \end{bmatrix} = \begin{bmatrix} A_d & 0 & 0 & \cdots & 0 \\ 0 & A_d^2 & 0 & \cdots & 0 \\ 0 & 0 & A_d^3 & \cdots & 0 \\ \vdots & \vdots & \vdots & \vdots & \vdots \\ 0 & 0 & 0 & \cdots & A_d^k \end{bmatrix} \begin{bmatrix} x_0 \\ x_0 \\ x_0 \\ \vdots \\ x_0 \end{bmatrix} + \begin{bmatrix} B_d & 0 & 0 & \cdots & 0 \\ A_d B_d & B_d & 0 & \cdots & 0 \\ A_d^2 B_d & A_d B_d & B_d & \cdots & 0 \\ \vdots & \vdots & \vdots & \vdots & \vdots \\ A_d^{k-1} B_d & u_d^{k-1} B_d & A_d^{k-2} B_d & \cdots & B_d \end{bmatrix} \begin{bmatrix} u_0 \\ u_1 \\ u_2 \\ \vdots \\ u_{k-1} \end{bmatrix} \tag{5}$$

where $x_1$ represents a vector corresponding to a first time step that is composed of the height of the center of mass in the vertical direction, the velocity of the center of mass in the vertical direction, and the acceleration of gravity, $x_2$ represents a vector corresponding to a second time step that is composed of the height of the center of mass in the vertical direction, the velocity of the center of mass in the vertical direction, and the acceleration of gravity, $x_k$ represents a vector corresponding to a $k^{th}$ time step that is composed of the height of the center of mass in the vertical direction, the velocity of the center of mass in the vertical direction, and the acceleration of gravity, and so on. $x_0$ is a vector corresponding to an initial moment that is composed of the height of the center of mass in the vertical direction, the velocity of the center of mass in the vertical direction, and the acceleration of gravity. The fifth equation (5) may also be abbreviated to a sixth equation (6)

$$X = A_{qp}x_0 + B_{qp}U \tag{6}$$

where $$X = \begin{bmatrix} x_1 \\ x_2 \\ x_3 \\ \vdots \\ x_k \end{bmatrix},$$

-continued $$A_{qp} = \begin{bmatrix} A_d & 0 & 0 & \cdots & 0 \\ 0 & A_d^2 & 0 & \cdots & 0 \\ 0 & 0 & A_d^3 & \cdots & 0 \\ \vdots & \vdots & \vdots & \vdots & \vdots \\ 0 & 0 & 0 & \cdots & A_d^k \end{bmatrix},$$

$$B_{qp} = \begin{bmatrix} B_d & 0 & 0 & \cdots & 0 \\ A_dB_d & B_d & 0 & \cdots & 0 \\ A_d^2B_d & A_dB_d & B_d & \cdots & 0 \\ \vdots & \vdots & \vdots & \vdots & \vdots \\ A_d^{k-1}B_d & u_d^{k-1}B_d & A_d^{k-2}B_d & \cdots & B_d \end{bmatrix},$$

and $$U = \begin{bmatrix} u_0 \\ u_1 \\ u_2 \\ \vdots \\ u_{k-1} \end{bmatrix}.$$

The sixth equation (6) has given a mathematical expression of the state transition equation corresponding to each time step. Based on the state transition equation corresponding to each time step shown in the sixth equation (6) and the buffer effect expected to achieve during the falling of the legged robot, the optimized objective function corresponding to each embodiment of this application is constructed to implement the solution of the optimal first expected moving trajectory. For example, the first expected moving trajectory causes the combination of the following to reach an extreme value: a fluctuation quantity of the center of mass of the legged robot, a total quantity of impact forces withstood by the legged robot, a squatting amount of the legged robot, and a sudden change amount of the impact forces withstood by the legged robot. The foregoing may each have a corresponding weight coefficient and combined in various manners.

Based on this, the optimization objective-Z function shown in a seventh equation (7) may be set to solve optimal thrust U.

$$\underset{U,\underline{x}}{\operatorname{argmin}} Z = \|A_{qp}X_0 + B_{qp}U - X_{ref}\|_L^2 + \|U\|_K^2 + \|h - \underline{x}\|_Q^2 + \|u_{k+1} - u_k\|_W^2 \quad (7)$$

$X_{ref}$ is a constant vector, representing a resting height shown by a dashed line in FIG. 4. $\underline{x}$ represents a minimum height of the center of mass in the whole process.

The first term $$\|A_{qp}X_0 + B_{qp}U - X_{ref}\|_L^2$$

of the Z function may be used as a representation form of the fluctuation quantity of the center of mass of the legged robot. To be specific, the legged robot is to satisfy a weighted value of a dynamic equation (the weight coefficient is L). For example, in FIG. 4, the first term is shown as a weighted value of an area of a gray region. A smaller II $A_{qp}X_0+B_{qp}U-X_{ref}\|^2$ leads to a smaller fluctuation of the center of mass and more stability of the legged robot during falling of the legged robot.

The second term $$\|U\|_K^2$$

of the Z function may be used as a representation form of a total quantity of impact forces withstood by the legged robot, which is a weighted value of an integral of a sum of reaction forces of the plane withstood by the legged robot over time (the weight coefficient is K). A smaller $\|U\|^2$ leads to a smaller sum of the impact forces withstood by the legged robot during the falling of the legged robot.

The third term $$\|h - \underline{x}\|_Q^2$$

of the Z function represents a weighted value of a distance between a lowest point of the center of mass of the legged robot and the resting height in the whole falling process (the weight coefficient is Q). A smaller $\|h-\underline{x}\|^2$ indicates a lower degree of squatting of the legged robot during the falling of the legged robot (to be specific, the legged robot can still maintain balance without squatting too low). The third $$\|h - \underline{x}\|_Q^2$$

term of the Z function may be used as a representation form of a squatting amount of the legged robot.

The fourth term $$\|h - \underline{x}\|_Q^2$$

of the Z function represents a weighted value of a difference in the reaction forces provided by the plane to the legged robot between adjacent time steps (the weight coefficient is W). A smaller $\|u_{k+1}-u_k\|^2$ indicates a smaller sudden change of the impact force withstood by the legged robot during falling of the legged robot. The fourth term $$\|u_{k+1} - u_k\|_W^2$$

of the Z function may be used as a representation form of a sudden change amount of the impact force withstood by the legged robot.

The foregoing is just a combination of the Z function. The foregoing terms of the Z function are just example representation forms of the fluctuation quantity of the center of mass of the legged robot, the total quantity of impact forces withstood by the legged robot, the squatting amount of the legged robot, and the sudden change amount of the impact force withstood by the legged robot. The embodiments of this application are not limited thereto.

In some embodiments, importance corresponding to each term is adjusted by using the foregoing weight coefficients. For example, a larger K indicates that the impact force withstood by the robot is more important in the control scheme of the legged robot. The embodiments of this application include a plurality of weighting schemes. For example, the weighting scheme may be a multiplicative weighting scheme, and the first term of the Z function may be expressed as $(A_{qp}X_0+B_{qp}U-X_{ref})^TL(A_{qp}X_0+B_{qp}U-X_{ref})$. The weighting scheme may alternatively be a power weighting scheme or an addition scheme. The embodiments of this application are not limited thereto. The remaining terms of the Z function may alternatively be calculated by using different weighting schemes, and so on.

The following constraints also need to be considered in the process of solving the Z function.

For example, a first constraint is $u_0 \le u^U$. $u_0$ represents a magnitude of an impact force withstood by the legged robot at a first instant the legged robot contacts the plane, which is less than a maximum impact force $u^U$ withstandable by the legged robot. The maximum impact force $u^U$ withstandable by the legged robot depends on structural characteristics of the legged robot and strength of a rigid body, and an example value thereof is 200 N. The embodiments of this application are not limited by the example value.

For example, a second constraint is $F^L \le u \le F^U$. $F^L$ represents a lower limit of a support force that the plane can provide, and $F^U$ represents an upper limit of the support force that the plane can provide. $F^L$ is usually 0 because the support force cannot be less than 0.

For example, a third constraint is $$[-B_{qp} \quad I]\begin{bmatrix} U \\ \underline{x} \end{bmatrix} \le A_{qp}x.$$

The third constraint indicates that a height of the center of mass of the legged robot in direction z at each moment is always greater than a minimum height $\underline{x}$. $\underline{x}$ is a column vector composed of lowest height sequence values.

In addition, depending on different configurations of the legged robot, more or fewer constraints may alternatively be included. The embodiments of this application are not limited thereto.

Mathematical equivalent transformation is performed on the seventh equation (7) to obtain an eighth equation (8).

$$\underset{U,\underline{x}}{\text{argmin}}Z = \|A_{qp}X_0 + B_{qp}U\|_L^2 + \|X_{ref}\|_L^2 - 2(A_{qp}X_0 + B_{qp}U)^T LX_{ref} + U^TKU + h^TQh + \underline{x}^TQ\underline{x} - 2\underline{x}^TQh + U^TWU \tag{8}$$

Mathematical equivalent transformation is performed on the eighth equation (8) to obtain a ninth equation (9).

$$\underset{U,\underline{x}}{\text{argmin}}Z = X_0^TA_{qp}^TLA_{qp}X_0 + 2U^TB_{qp}^TLA_{qp}X_0 + U^TB_{qp}^TLB_{qp}U + \|X_{ref}\|_L^2 - 2A_{qp}X_0LX_{ref} - 2U^TB_{qp}^TLX_{ref} + U^TKU + h^TQh + \underline{x}^TQ\underline{x} - 2\underline{x}^TQh + U^TWU \tag{9}$$

Mathematical equivalent transformation is performed on the ninth equation (9) to obtain a tenth equation (10).

$$\underset{U,\underline{x}}{\text{argmin}}Z = X_0^TA_{qp}^TLA_{qp}X_0 + \|X_{ref}\|_L^2 - 2A_{qp}X_0LX_{ref} + h^TQh + U^T(B_{qp}^TLB_{qp} + K + W)U + 2U^TB_{qp}^T(LA_{qp}X_0 - LX_{ref}) + \underline{x}^TQ\underline{x} - 2\underline{x}^TQh \tag{10}$$

Mathematical equivalent transformation is performed on the tenth equation (10) to obtain an eleventh equation (11).

$$\underset{U,\underline{x}}{\text{argmin}}Z = X_0^TA_{qp}^TLA_{qp}X_0 + \|X_{ref}\|_L^2 - 2A_{qp}X_0LX_{ref} + h^TQh + \begin{bmatrix} U \\ \underline{x} \end{bmatrix}^T \begin{bmatrix} B_{qp}^TLB_{qp} + K + W & 0 \\ 0 & Q \end{bmatrix} \begin{bmatrix} U \\ \underline{x} \end{bmatrix} + 2\begin{bmatrix} U \\ \underline{x} \end{bmatrix}^T \begin{bmatrix} B_{qp}^T(LA_{qp}X_0 - LX_{ref}) \\ -Qh \end{bmatrix}^T \tag{11}$$

where W satisfies a twelfth equation (12).

$$W = \begin{bmatrix} K & -K & & & & \\ -K & 2K & -K & & & \\ & -K & 2K & -K & & \\ & & \ddots & \ddots & \ddots & \\ & & & -K & 2K & -K \\ & & & & -K & K \end{bmatrix} \tag{12}$$

where $$X_0^TA_{qp}^TLA_{qp}X_0 + \|X_{ref}\|_L^2 - 2A_{qp}X_0LX_{ref} + h^TQh$$

does not include a variable U, which does not affect the minimum value of the Z function. Therefore, $$X_0^TA_{qp}^TLA_{qp}X_0 + \|X_{ref}\|_L^2 - 2A_{qp}X_0LX_{ref} + h^TQh$$

may not be calculated.

In other words, $$\underset{U,\underline{x}}{\text{argmin}}Z$$

may be finally expressed by a thirteenth equation (13).

$$\underset{U,\underline{x}}{\text{argmin}}Z = \frac{1}{2}U^THU + U^Tg \tag{13}$$

where $$H = \begin{bmatrix} B_{qp}^TLB_{qp} + K + W & 0 \\ 0 & Q \end{bmatrix},$$

and $$g = 2\begin{bmatrix} B_{qp}^T(LA_{qp}X_0 - LX_{ref}) \\ -Qh \end{bmatrix}.$$

In response to solving U and $\underline{x}$ that minimize Z, the optimal first expected moving trajectory in FIG. 4 may be further solved, that is, a sequence of values of the center of mass in the direction z corresponding to time steps. In some other embodiments of this application, a full model of the legged robot may also be used to plan the first expected moving trajectory of the legged robot. Such a first expected moving trajectory planned in the embodiments has high precision, but often requires higher computing power to achieve real-time planning.

In the foregoing embodiments of this application, a motion trajectory of the center of mass of the legged robot after landing is planned based on the approximate model (or the full model). Therefore, it is ensured that each joint withstand only a small impact force, the body rebound is small, and a change of the tilt angle is small during the landing of the legged robot, and a good anti-impact protection effect can be achieved on the legged robot while the landing function is ensured.

Figure 6:
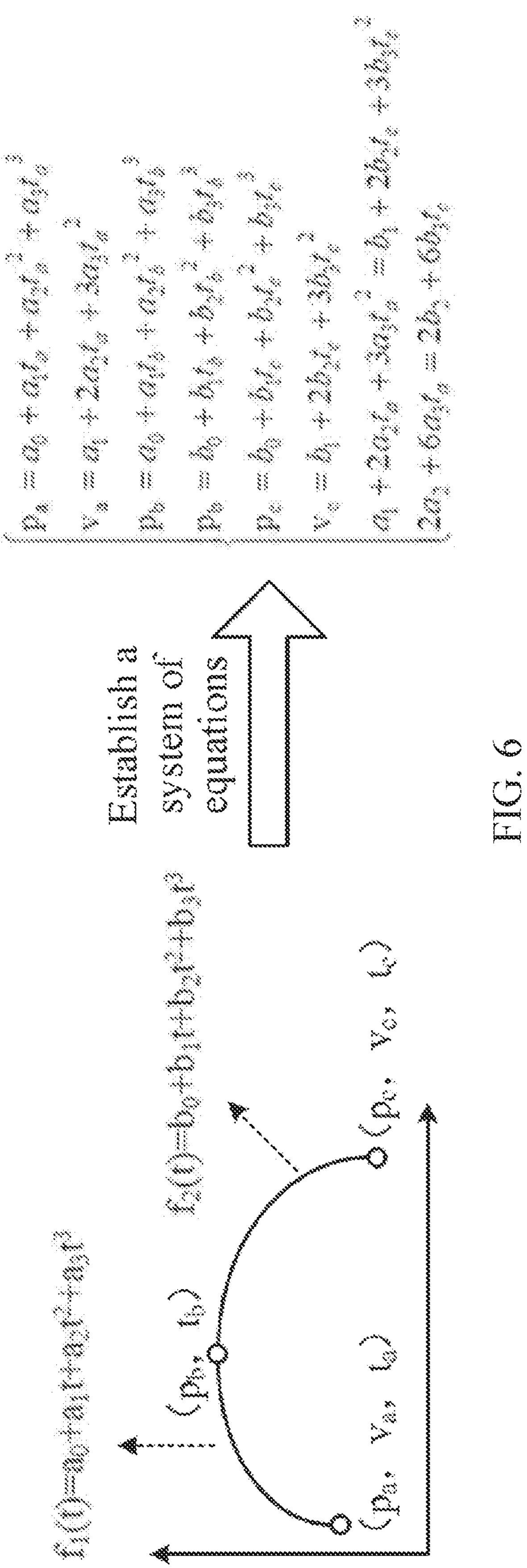
FIG. 6 is a schematic diagram of a calculation principle of cubic spline interpolation according to an embodiment of this application.

Next, an embodiment of how to determine a second expected moving trajectory of the legged robot is further described with reference to FIG. 5 and FIG. 6. FIG. 5 is a schematic diagram showing that a robotic leg contacts a plane during landing of a legged robot according to an embodiment of this application. FIG. 6 is a schematic diagram of a calculation principle of cubic spline interpolation according to an embodiment of this application.

Because the legged robot performing the flipping task often has a toppling tendency at an instantaneous moment the legged robot falls until each robotic leg contacts the plane, the action of each joint after each robotic leg of the legged robot contacts the plane needs to be controlled, so that each robotic leg of the legged robot moves along the toppling tendency of the legged robot, and each robotic leg gradually rebounds from a compressed state until the center of mass of the legged robot reaches an expected resting height and the rotation angle in the direction of the tilt angle of the legged robot is zero. The toppling tendency may be at least one of a forward toppling tendency, a backward toppling tendency, a leftward toppling tendency, and a rightward toppling tendency.

Based on this, in some embodiments, the determining a second expected moving trajectory of the legged robot further includes: determining, at an instantaneous moment each robotic leg contacts the plane, foot end position coordinates of the foot end of each robotic leg at an initial moment, and determining the foot end position coordinates at the initial moment as an initial foot end position; determining foot end position coordinates of the foot end of each robotic leg at a stable moment based on a toppling tendency direction of each robotic leg when coming into contact with the plane and the initial foot end position, and determining the foot end position coordinates at the stable moment as a terminal foot end position, at the stable moment, a height of the base of the legged robot being constant and the rotation angle in the direction of the tilt angle of the legged robot being zero; and determining, based on the initial foot end position and the terminal foot end position, a motion trajectory of the foot end of each robotic leg as the second expected moving trajectory by using cubic spline interpolation.

For the step of "determining, at an instantaneous moment each robotic leg contacts the plane, foot end position coordinates of the foot end of each robotic leg at an initial moment, and determining the foot end position coordinates at the initial moment as an initial foot end position", in some embodiments, a computer device may input sensing information of the legged robot collected at the current moment into a leg odometer, so that the leg odometer calculates a position of each robotic leg of the legged robot at the current moment based on the sensing information to obtain position information.

The position information of the foot end position coordinates includes at least directional position vectors of other three robotic legs in a world coordinate system. Different directional position vectors correspond to different coordinate axis directions. One directional position vector is used for indicating a position of each robotic leg of the legged robot in the corresponding coordinate axis direction.

The leg odometer calculates the directional position vector corresponding to a horizontal axis direction in the following manners. First, a rotation matrix is calculated based on current pose information. The so-called rotation matrix refers to a matrix that maps any vector to a robot base coordinate system by changing a direction of any vector. A base pose angle of the legged robot may be determined based on the current pose information, and the rotation matrix may be calculated based on the pose angle of the base. In addition, a reference position vector may also be calculated based on joint angle information of each joint, and the reference position vector is used for indicating a relative position between a center of mass of the base of the legged robot and the foot end of each robotic leg. Next, the rotation matrix may be used to map the reference position vector to the robot base coordinate system to obtain a target position vector. In some embodiments, the rotation matrix is multiplied by the reference position vector to obtain the target position vector.

In addition, a three-dimensional position vector of the center of mass of the legged robot in the world coordinate system may be obtained. Then fusion processing may be performed on a component of the target position vector in the horizontal axis direction and a component of the three-dimensional position vector in the horizontal axis direction, to obtain the directional position vector corresponding to the horizontal axis direction. The fusion processing herein may include summation processing.

For the step of "determining foot end position coordinates of the foot end of each robotic leg at a stable moment based on a toppling tendency of each robotic leg when coming into contact with the plane and the initial foot end position, and determining the foot end position coordinates at the stable moment as a terminal foot end position, at the stable moment, a height of the base of the legged robot being constant and the rotation angle in the direction of the tilt angle of the legged robot being zero", in some embodiments, the length of each robotic leg is the same at the stable moment. If a height difference between a connection point between the leg and the body of the robot and the center of mass of the robot is not considered, the lengths of 4 legs are all equal to a height of the robot.

In some embodiments, during implementation of the step of "determining foot end position coordinates of the foot end of each robotic leg at a stable moment based on a toppling tendency of each robotic leg when coming into contact with the plane and the initial foot end position", offset information corresponding to the toppling tendency of each robotic leg when coming into contact with the plane is obtained first, and the foot end position coordinates of the foot end of each robotic leg at the stable moment are determined based on the offset information corresponding to the toppling tendency of each robotic leg when coming into contact with the plane and the initial foot end position of each robotic leg.

In some embodiments, for the step of "determining the foot end position coordinates of the foot end of each robotic leg at the stable moment based on the offset information corresponding to the toppling tendency of each robotic leg when coming into contact with the plane and the initial foot end position of each robotic leg", a first position component corresponding to the initial foot end position of each robotic leg in a first direction, a second position component corresponding to a second direction, and a third position component corresponding to a third direction are first determined, the first direction being a direction corresponding to the toppling tendency, and the second direction and the third direction being other two directions in a world coordinate system other than the first direction. The offset information is combined with the first position component corresponding to the initial foot end position of each robotic leg in the toppling tendency, to obtain a first offset position component corresponding to each robotic leg in the first direction. The first offset position component corresponding to the first direction, the second position component corresponding to the second direction, and the third position component corresponding to the third direction are determined as the foot end position coordinates of the food end of each robotic leg at the stable moment.

As shown in the left diagram of FIG. 5, the four robotic legs of the legged robot often tend to topple when coming into contact with the plane. Assuming that at the instantaneous moment each robotic leg contacts the plane (an initial moment shown in FIG. 5, that is, the instantaneous moment the last robotic leg contacts the plane), it is determined that the legged robot tends to topple forward (or a forward velocity at the instantaneous moment is greater than a preset velocity threshold, or an angular velocity in the direction of the tilt angle is greater than a preset angular velocity threshold), the terminal foot end position of the front leg in the expected moving trajectory may be set as a specific position in front of the contact position between the front leg and the plane by using the offset information corresponding to the forward toppling tendency. For example, it is assumed that a component of the foot end position coordinates of the front leg of the legged robot in an x-axis direction of the world coordinate system at the moment the last robotic leg contacts the plane is 5 cm. Based on a size of the legged robot, in the case of the tendency to topple forward, at the stable moment, a component of an expected value of the foot end position coordinates of the front leg of the legged robot in the x-axis direction of the world coordinate system may range from 8 cm to 20 cm. A specific numerical value is related to the size and engineering experience of the legged robot, and is not limited herein. In addition, the foot end position coordinates of the rear leg at the stable moment may be determined based on the height and a pose of the legged robot at the stable moment and based on the foot end position coordinates of the front leg at the stable moment. The embodiments of this application are not limited thereto.

Assuming that at the instantaneous moment each robotic leg contacts the plane, it is determined that the legged robot tends to topple backward (or a backward velocity at the instantaneous moment is greater than a velocity threshold, or an angular velocity in the direction of the tilt angle is greater than an angular velocity threshold), the terminal foot end position of the front leg in the expected moving trajectory may be set as a specific position behind the contact position between the front leg and the plane. For example, it is assumed that a component of the foot end position coordinates of the front leg of the legged robot in the x-axis direction of the world coordinate system at the moment the last robotic leg contacts the plane is 20 cm. Based on a size of the legged robot, in the case of the tendency to topple backward, at the stable moment, a component of an expected value of the foot end position coordinates of the front leg of the legged robot in the x-axis direction of the world coordinate system may range from 2 cm to 5 cm. A specific numerical value is related to the size and engineering experience of the legged robot, and is not limited herein. In addition, the foot end position coordinates of the rear leg at the stable moment may be determined based on the height and a pose of the legged robot at the stable moment and based on the foot end position coordinates of the front leg at the stable moment. The embodiments of this application are not limited thereto.

Assuming that at the instantaneous moment each robotic leg contacts the plane, it is determined that the legged robot tends to topple leftward (or a leftward velocity at the instantaneous moment is greater than a velocity threshold, or an angular velocity in a direction of a roll angle is greater than an angular velocity threshold), the terminal foot end position of the front leg in the expected moving trajectory may be set as a specific position to the left of the contact position between the front leg and the plane. For example, it is assumed that a component of the foot end position coordinates of the front leg of the legged robot in a y-axis direction of the world coordinate system at the initial moment is 5 cm (a z-axis direction is vertically upward, the x-axis direction is horizontally rightward, and the y-axis direction is perpendicular to a plane formed by an x axis and a z axis and conforms to the right-hand rule). Based on a size of the legged robot, in the case of the tendency to topple leftward, at the stable moment, a component of an expected value of the foot end position coordinates of the front leg of the legged robot in the y-axis direction of the world coordinate system may range from 8 cm to 20 cm. A specific numerical value is related to the size and engineering experience of the legged robot, and is not limited herein. In addition, the foot end position coordinates of the rear leg at the stable moment may be determined based on the height and a pose of the legged robot at the stable moment and based on the foot end position coordinates of the front leg at the stable moment. The embodiments of this application are not limited thereto.

Assuming that at the instantaneous moment each robotic leg contacts the plane, it is determined that the legged robot tends to topple rightward (or a rightward velocity at the instantaneous moment is greater than a velocity threshold, or an angular velocity in the direction of the roll angle is greater than an angular velocity threshold), the terminal foot end position of the front leg in the expected moving trajectory may be set as a specific position to the right of the contact position between the front leg and the plane. For example, it is assumed that a component of the foot end position coordinates of the front leg of the legged robot in a y-axis direction of the world coordinate system at the moment the last robotic leg contacts the plane is 20 cm (the z-axis direction is vertically upward, the x-axis direction is horizontally rightward, and the y-axis direction is perpendicular to a plane formed by an x axis and a z axis and conforms to the right-hand rule). Based on a size of the legged robot, in the case of the tendency to topple rightward, at the stable moment, a component of an expected value of the foot end position coordinates of the front leg of the legged robot in the y-axis direction of the world coordinate system may range from 2 cm to 5 cm. A specific numerical value is related to the size and engineering experience of the legged robot, and is not limited herein. In addition, the foot end position coordinates of the rear leg at the stable moment may be determined based on the height and a pose of the legged robot at the stable moment and based on the foot end position coordinates of the front leg at the stable moment. The embodiments of this application are not limited thereto.

Although the foregoing scenarios are described by using the world coordinate system as an example, the calculation may also be performed based on a body coordinate system in all of the embodiments of this application. The embodiments of this application are not limited thereto.

For the step of "determining the motion trajectory of an end of each robotic leg away from the base as the second expected moving trajectory by using cubic spline interpolation based on the initial foot end position and the terminal foot end position", in some embodiments, during the evolution from the left diagram of FIG. 5 to the right diagram of FIG. 5, x- and y-direction sequences of values of the terminal position of the foot end of each robotic leg are implemented by using the cubic spline interpolation of the positions at the initial moment and the end moment. Similarly, the x- and y-direction sequences of values of the center of mass of the legged robot are implemented by using the cubic spline interpolation of the positions at the initial moment and the end moment.

As shown in FIG. 6, the cubic spline interpolation provided in the embodiments of this application is dividing known data into a plurality of segments. A cubic function is constructed for each segment, and it is ensured that the curve passes through specific points and that a specific speed constraint is satisfied at some specific points. For example, it is assumed that the known data includes three pieces of data such as (pa, va, ta), (pb, vb, tb), and (pc, vc, tc), p represents a position, v represents a velocity, and t represents time, and that the known data is divided into two segments is used as an example. For the calculation principle of the cubic spline interpolation, reference may be made to FIG. 6. Two cubic functions, f1(*t*) and f2(*t*), may be constructed first, and then a system of equations may be established based on the two cubic functions and the known data, so that cubic polynomial coefficients (a0, a1, a2, a3, b0, b1, b2, b3) may be solved by using the system of equations. After the cubic polynomial coefficients are solved, the two cubic functions may be subsequently used to determine a position and a corresponding velocity of the legged robot at any moment, thereby implementing control of the legged robot.

In some embodiments, a z-direction sequence of values of each robotic leg may be correspondingly solved based on the first expected moving trajectory. After four robotic legs of the legged robot all contact the plane, a length of the remaining robotic leg varies with the height of the center of mass of the legged robot. Therefore, the z-direction sequence of values of each robotic leg may be described as the height at which the foot end of each robotic leg may just contact the plane when the center of mass of the legged robot reaches a position indicated by the first expected moving trajectory in the direction z. In addition, the z-direction sequence of values of the other three robotic legs may also be solved by using the cubic spline interpolation, and the embodiments of this application are not limited thereto.

Figure 7A:
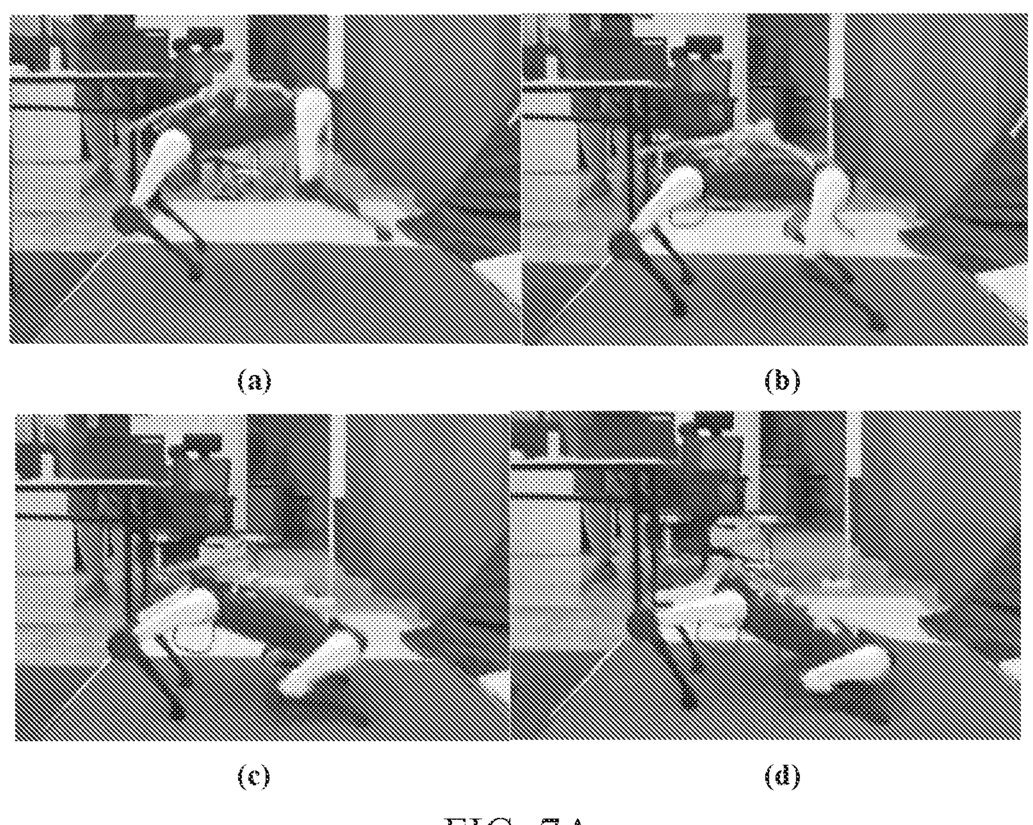
FIG. 7A is a schematic diagram showing a first action of a legged robot landing after performing flipping according to an embodiment of this application.
Figure 7B:
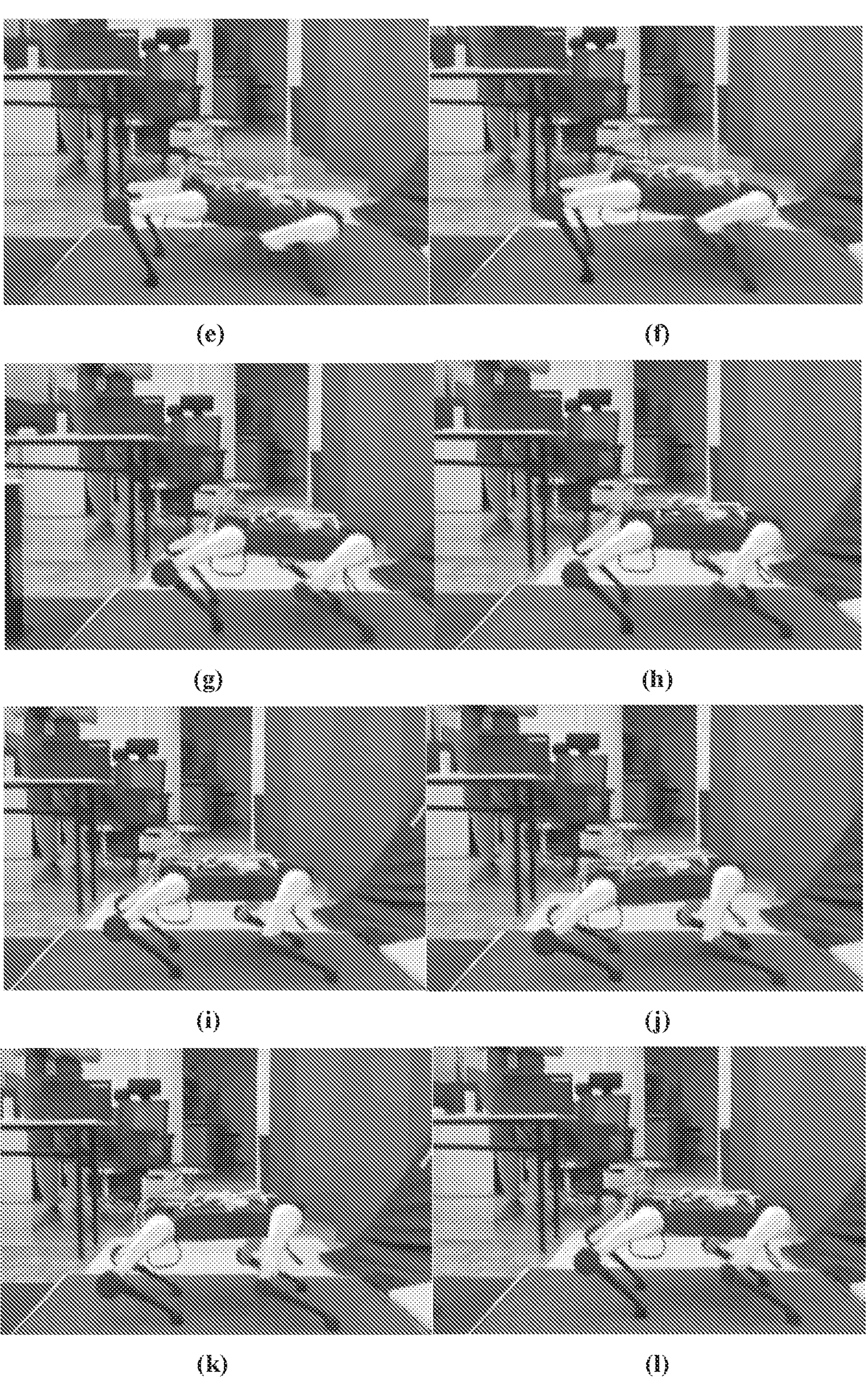
FIG. 7B is a schematic diagram showing a second action of a legged robot landing after performing flipping according to an embodiment of this application.

Next, an embodiment of how to control, based on a dynamic model corresponding to the legged robot, the first expected moving trajectory, and the second expected moving trajectory, an action of each joint after the legged robot contacts the plane is further described with reference to FIG. 7A and FIG. 7B. FIG. 7A and FIG. 7B show an action of a legged robot landing after performing flipping according to an embodiment of this application. The action shown in FIG. 7B is a continuation of the action shown in FIG. 7A.

The scheme of controlling the legged robot based on the dynamic equation of the legged robot provided in the embodiments of this application and the foregoing first expected moving trajectory is also referred to as MPC. The scheme of controlling each joint based on the dynamic equation and a second expected moving trajectory is also referred to as whole-body dynamics control (WBC).

In the embodiments of this application, the MPC and the WBC are combined to implement the buffer control of the legged robot performing the flipping task during the landing, which may be simply described as: optimizing an output of a controller (that is, a torque of each joint motor) by calculating a trajectory of a future control variable (that is, the first expected moving trajectory and the second expected moving trajectory). The optimization process is performed in a limited time window, and initial system information of the time window is used for optimization. A starting moment of the time window is an instant a robotic leg of the legged robot contacts the plane, and an ending moment is a moment the legged robot stands stably.

As an example, the dynamic equation of the legged robot may be expressed by a fourteenth equation (14).

$$\begin{bmatrix} M_p \\ M_\theta \end{bmatrix}\begin{bmatrix} \ddot{p} \\ \ddot{\theta} \end{bmatrix} + \begin{bmatrix} C_p \\ C_\theta \end{bmatrix} = \begin{bmatrix} 0 \\ \tau \end{bmatrix} + \begin{bmatrix} J_p^T \\ J_\theta^T \end{bmatrix} f \tag{14}$$

By solving a particle dynamic equation of the legged robot shown in a fifteenth equation (15), a ground contact force f may be obtained.

$$M_p\ddot{p} + C_p = J_p^T f \tag{15}$$

where $M_p$ represents a mass and inertia matrix corresponding to a base. $\ddot{p}$ represents a six-dimensional position and pose vector of the center of mass, which is a sequence corresponding to the first expected moving trajectory. Optionally, in this case, the position of the center of mass is related to a position in the direction of gravity (a direction z) and a rotation angle in the direction of the tilt angle of the legged robot. Rotation angles in a direction x and a direction y are both zero, and a rotation angle value in a direction of a roll angle and a rotation angle in a direction of a yaw angle are both zero. f represents a contact force provided by the plane to four foot ends, and the contact force provided by the plane to each foot end is a three-dimensional force. Therefore, a total number of dimensions of f is 12. $C_p$ represents a gravity term, a centrifugal force term, and a Coriolis force term of the base.

$$J_p^T$$

represents transpose of the Jacobian matrix of the base. Based on this, the MPC may be used to solve the contact force f provided by the plane to the legged robot. To be specific, a contact force between the plane and each robotic leg of the legged robot at each time step can be determined based on the dynamic model corresponding to the legged robot, so that an actual trajectory of the center of mass of the legged robot moving in the direction of gravity and an actual trajectory of the change in the tilt angle of the legged robot are both consistent with the first expected moving trajectory.

The lower half of the fourteenth equation (14) (as shown in the sixteenth equation (16) below) is a joint dynamic equation of the legged robot.

$$M_\theta\ddot{\theta} + C_\theta = \tau + J_\theta^T f \tag{16}$$

where $M_\theta$ represents a mass and inertia matrix corresponding to each joint, and θ represents angles of all drivable degrees of freedom (a quadruped robot shown in FIG. 1 or FIG. 5 includes degrees of freedom corresponding to 12 joint motors). $C_\theta$ represents a gravity term, a centrifugal force term, and a Coriolis force term of a drivable joint.

$$J_\theta^T$$

represents transpose of the Jacobian matrix of the drivable joint. $\ddot{\theta}$ is an angular acceleration of 12 joints of the legged robot that may be actively driven. $\tau$ is an input torque of the 12 joints. The contact force f calculated according to the fifteenth equation (15) and other parameters of the robot dynamic model are all known, and the torque $\tau$ of each joint of the robot may be obtained by using the sixteenth equation (16).

In some embodiments, the sixteenth equation (16) may also be transformed into a form of a seventeenth equation (17).

$$\tau = -J_\theta^T f + M_\theta\ddot{\theta} + C_\theta \approx -J_\theta^T f + M_\theta\ddot{\theta} \tag{17}$$

where $\ddot{\theta}$ may be solved by using an eighteenth equation (18).

$$\ddot{x}^d = J_p\ddot{p} + \dot{J}_p\dot{p} + J_\theta\ddot{\theta} + \dot{J}_\theta\dot{\theta} \tag{18}$$

where $\ddot{x}^d = k_p(x^d - x) + k_d(\dot{x}^d - \dot{x})$. $x^d$ and $\dot{x}^d$ are determined by the second expected moving trajectory (which respectively indicates an expected foot end position of each robotic leg and an expected foot end velocity of each robotic leg). x and $\dot{x}$ are an actual foot end position of each robotic leg and an actual foot end velocity of each robotic leg. However, $k_p$ is a proportional control feedback coefficient, and $k_d$ is a differential control feedback coefficient.

To be specific, a motor torque provided by each joint motor at each time step is determined based on the dynamic model corresponding to the legged robot and the contact force between each robotic leg of the legged robot and the plane at each time step, so that a trajectory of an end of each robotic leg away from the base is consistent with the second expected moving trajectory.

In some embodiments, the foregoing proportional control feedback coefficient may also be set respectively for the compression and rebound states of each robotic leg. After current state information of the legged robot is obtained, a robotic leg state of each robotic leg is determined based on comparison of a current joint angle in the current state information of each robotic leg with the joint angle in a normal standing pose of the robotic leg and a changing trend of the joint angle. The robotic leg state may be a compressed state or a rebound state. Then, the proportional control feedback coefficient and the differential control feedback coefficient corresponding to the robotic leg state are obtained according to the nineteenth equation (19). For example, it is assumed that for a robotic leg, an initial moment the robotic leg lands is $t_0$, and then the robotic leg begins to enter the compressed state until a time $t_1$. The robotic leg is compressed to a lowest point and begins to rebound, and a time until the robotic leg rebounds to a normal standing height is $t_2$. At three moments $t_0$, $t_1$, and $t_2$, the proportional control feedback coefficients $k_{p0}$, $k_{p1}$, and $k_{p2}$ are respectively set. The proportional control feedback coefficients $k_p$ at the remaining intermediate moments (time steps) may be further obtained by using the cubic spline interpolation or quartic spline interpolation ($g_1$ or $g_2$) of the proportional control feedback coefficients based on the three moments. To be specific, the nineteenth equation (19) may be used to obtain the proportional control feedback coefficient $k_p$ at the remaining intermediate moments (time steps).

$$k_p(t) = \begin{cases} g_1(t_0, k_{p0}, t_1, k_{p1}), & t \in [t_0, t_1] \\ g_2(t_1, k_{p1}, t_2, k_{p2}), & t \in (t_1, t_2] \end{cases} \tag{19}$$

Similarly, the differential control feedback coefficient may be solved. For example, let $t_0=0$, $t_1$ being approximately equal to 0.1 s, and $t_2$ being approximately equal to 0.2 s. $k_{p0}=500$, $k_{p1}=400$, and $k_{p3}=250$. $k_{d0}=k_{d1}=k_{d2}=2$. The embodiments of this application are not limited by values of the foregoing specific numerical values.

Considering complexity of the flipping task, in some embodiments, the buffer control of the legged robot performing the flipping task during the landing may also be divided into the following three stages.

In a first stage, within a total time step corresponding to the first expected moving trajectory, a target sequence that the controller needs to track is determined based on the first expected moving trajectory, and a relevant weight value of the controller is adjusted based on an actual observation situation. In this case, a total duration of the total time step corresponding to the first expected moving trajectory may be 0.5 s. The total duration may depend on parameters of the robot and the engineering experience. The embodiments of this application are not limited by the values of the foregoing specific numerical values.

In a second stage, after the total time step corresponding to the first expected moving trajectory, a preset duration may be set based on the engineering experience, and an actual state value of the legged robot at the end moment of the first stage is compared with a terminal value of the first expected moving trajectory, to determine a reference trajectory of the position and the pose of the center of mass in the second stage. In some embodiments, linear or cubic spline interpolation may be performed on the actual state value of the legged robot at the end moment of the first stage and the terminal value of the first expected moving trajectory, to obtain the foregoing reference trajectory of the position and the pose of the center of mass. Based on the reference trajectory, a computer device may further calculate a feedforward torque of each joint, to complete the control of the legged robot in the second stage. In this stage, due to a difference in states of the robot at the starting moment, a large speed may still exist in the direction z, the direction x, or a pitch direction, and the relevant weight value of the controller needs to be adaptively adjusted. A weight value of this part may be quite different from the weight value of the controller in the first stage.

In a third stage, through the control of the previous two stages, when the stage is entered, the pose of the legged robot substantially satisfies a requirement for the legged robot to stand stably at a position. Velocity values of the position and the pose of the center of mass are relatively small. In this case, a control policy may be changed, so that the legged robot maintains a stable standing pose. The control policy may include an interpolation policy of the proportional control feedback coefficient and the differential control feedback coefficient. In some embodiments, a joint force control mode is used in the first stage and the second stage (to be specific, control of the joint motor of the robot is mainly implemented by transmitting a forward torque to the joint motor), and a joint position control mode is used in the third stage (to be specific, control of a joint angle of the robot is mainly implemented by transmitting expected position information to the joint motor). The joint position control mode is more stable, but the dynamic performance is relatively weak. The dynamic performance of the joint force control mode is relatively strong, but the stability is relatively weak.

As shown in FIG. 7A and FIG. 7B, in real machine testing, when the robot starts forward flipping from a position with a height of 0.5 meters, the maximum height of the center of mass during the flipping is about 1 meter from the ground. At an instant of contact with the ground, the length of the robotic leg is reduced, and a distance between the base and the plane gradually decreases. The robotic leg applies a reaction force to the center of mass of the legged robot. Under the action of the reaction force, a body pose of the legged robot decelerates, and thrust of a front leg is greater than thrust of a rear leg. This process implements a deceleration effect in the direction of the tilt angle of the legged robot, so that the tilt angle of the legged robot is consistent with an expected pose angle trajectory as much as possible. However, during the height rebound of the robot body, a foot end height of the robot is not allowed to rebound from the plane, and overshoot is small in the whole process of the height change of the center of mass. At the end moment of the control, the robot may stand on the ground in a preset pose, and the pose and the rebounding process of the height of the center of mass meet expectations as a whole.

In the embodiments of this application, a dynamic model is established for the legged robot in free-fall motion, the motion trajectory of the center of mass and the position trajectory of the foot end of the legged robot after landing are planned based on the dynamic model, and the control torque of each motor is determined based on the planned motion trajectory of the center of mass and the position trajectory of the foot end, to control the legged robot. Therefore, during the landing of the legged robot, the impact force withstood by each joint can be reduced, the body rebound amplitude of the body and the change amplitude of the tilt angle can be reduced, and a good anti-impact protection effect may be achieved on the legged robot while the landing function is ensured.

Next, how to obtain a current state of the legged robot to implement more accurate control in the process of controlling the action of each joint of the legged robot is further described with reference to FIG. 8. FIG. 8 shows a control system architecture of a legged robot according to an embodiment of this application.

Although a description of how to control the action of each joint of the legged robot based on the dynamic model, the first expected moving trajectory, and the second expected moving trajectory has been given with reference to FIG. 7A and FIG. 7B, in the actual control process, due to a limitation of hardware, a corresponding joint torque cannot be often accurately outputted at each time step. Therefore, the current state of the legged robot needs to be estimated in real time to fine-tune control information. To be specific, step S202 further includes: determining a motor torque provided by each joint motor at each time step based on the dynamic model corresponding to the legged robot and the contact force between each robotic leg of the legged robot and the plane at each time step; and adjusting the motor torque provided by each joint motor at each time step based on the current state information of the legged robot.

First, during the landing after the flip of the legged robot, starting from an instantaneous moment each robotic leg contacts the plane until the legged robot is stable, a position of each robotic leg of the legged robot at the current moment may be calculated based on sensing information of the legged robot collected at the current moment, to obtain a position calculation result.

The sensor information refers to information collected by a sensor in the legged robot. It may be learned from the foregoing that the sensor in the legged robot may include an IMU sensor, a joint angle encoder, and the like. The IMU sensor may be configured to collect pose information and an acceleration of the legged robot in real time. The joint angle encoder may be configured to provide joint angle information (such as a joint angle and an angular velocity feedback value) of each joint of each robotic leg of the legged robot in real time. Based on this, the sensing information may include current pose information of the legged robot collected by using the IMU sensor, and the joint angle information of each joint of the legged robot collected by using the joint angle encoder.

In some embodiments, a computer device may input sensing information of the legged robot collected at the current moment into a leg odometer, so that the leg odometer calculates the position of each robotic leg of the legged robot at the current moment based on the sensing information, to obtain a position calculation result. The position calculation result may include at least at least two directional position vectors in a world coordinate system. Different directional position vectors correspond to different coordinate axis directions. One directional position vector is used for indicating a position of each robotic leg of the legged robot in the corresponding coordinate axis direction. When it is approximately considered that the legged robot moves in a two-dimensional plane (a plane formed by an x-axis (a horizontal axis) and a z-axis (a vertical axis)), the at least two directional position vectors may include a directional position vector corresponding to the horizontal axis direction (represented by $p_{sx}$), and a directional position vector corresponding to the vertical axis direction (represented by $p_{sz}$). In some embodiments, considering that the legged robot actually moves in a three-dimensional space, the at least two directional position vectors may further include a directional position vector corresponding to the direction of the vertical axis (the y-axis) (represented by $p_{sy}$), which is not limited. It may be understood that $p_{sx}$ is used for indicating the position of each robotic leg in the x-axis direction, $p_{sz}$ is used for indicating the position of each robotic leg in the z-axis direction, and $p_{sy}$ is used for indicating the position of each robotic leg in the y-axis direction. In addition, when the legged robot is a quadruped robot, one robotic leg corresponds to one dimension, and dimensions of $p_{sx}$, $p_{sz}$, and $p_{sy}$ are all 4 dimensions.

The leg odometer calculates the directional position vector corresponding to a horizontal axis direction in the following manners. First, a rotation matrix (which may be expressed by R) may be calculated based on the current pose information. The so-called rotation matrix refers to a matrix that maps any vector to a robot base coordinate system by changing a direction of any vector. Specifically, a base pose angle of the legged robot may be determined based on the current pose information, and the rotation matrix may be calculated based on the base pose angle. In addition, a reference position vector (which may be expressed by $p^{rel}$) may also be calculated based on the joint angle information of each joint, and the reference position vector is used for indicating a relative position between a center of mass of the base of the legged robot and the foot end of each robotic leg. Next, the rotation matrix may be used to map the reference position vector to the robot base coordinate system to obtain a target position vector. In some embodiments, the rotation matrix may be multiplied by the reference position vector to obtain the target position vector. $p_f$ is used to represent the target position vector, and $p_f=Rp^{rel}$. In addition, a three-dimensional position vector (represented by $p_0$) of the center of mass of the base of the legged robot in the world coordinate system may be obtained. Then fusion processing may be performed on a component (represented by $p_f(x)$) of the target position vector in the horizontal axis direction and a component (represented by $p_0(x)$) of the three-dimensional position vector in the horizontal axis direction, to obtain the directional position vector (represented by $p_{sx}$) corresponding to the horizontal axis direction. The fusion processing herein may include summation processing, that is, $p_{sx}=p_0(x)+p_f(x)$.

The manner in which the leg odometer calculates the directional position vector corresponding to another coordinate axis (such as a vertical axis or a perpendicular axis) direction is similar to the manner of calculating the directional position vector corresponding to the horizontal axis direction, and details are not described herein again. In addition, the position calculation result may include not only at least two directional position vectors in the world coordinate system, but also other vectors such as a foot end position vector in a robot body coordinate system and a foot end velocity vector in the robot base coordinate system. The foot end position vector is used for indicating a three-dimensional position of the foot end of each robotic leg of the legged robot in the robot base coordinate system. The manner in which the leg odometer calculates the foot end position vector may include: performing inversion processing on the target position vector to obtain the foot end position vector. The foot end velocity vector is used for indicating a three-dimensional velocity of the foot end of each robotic leg of the legged robot in the robot base coordinate system. The manner in which the leg odometer calculates the foot end velocity vector may include: performing derivation on the target position vector, and performing inversion processing on the derivative result to obtain the foot end velocity vector. It is to be understood that when the legged robot is the quadruped robot, the foot end position vector and the foot end velocity vector are both 12 dimensions.

Based on the foregoing description, when the position calculation result includes the foot end position vector in the robot base coordinate system (represented by $p_s$), the foot end velocity vector in the robot base coordinate system (represented by $v_s$), the directional position vector corresponding to the horizontal axis direction (represented by $p_{sx}$), and the directional position vector corresponding to the vertical axis direction (represented by $p_{sz}$), the manner in which the leg odometer calculates the position calculation result (y) may be shown in a twentieth equation (20).

$$y=\begin{bmatrix} Bp_s \\ Bv_s \\ Wp_{sz} \\ Wp_{sx} \end{bmatrix}=\begin{bmatrix} -pf \\ -\frac{d}{dt}(pf) \\ p_0(z)+p_f(z) \\ p_0(x)+p_f(x) \end{bmatrix} \tag{20}$$

In the twentieth equation (20), a subscript of B represents the definition in the robot base coordinate system, and a subscript of W represents the definition in the world coordinate system. In addition, (z) and (x) respectively represent components of the preceding vector on the z axis and the x axis. Based on the foregoing description, it may be learned that in the embodiments of this application, not only $p_s$, $v_s$, and $p_{sz}$ but also $p_{sx}$ and corresponding terms may be added to the position calculation result. This helps improve accuracy of state estimation in the x-axis direction.

It is to be understood that each information in the position calculation result (such as $p_s$, $v_s$, $p_{sx}$, and $p_{sz}$) includes a sub-vector corresponding to each robotic leg of the legged robot. For example, $p_s$ includes a foot end position sub-vector corresponding to each robotic leg. Any foot end sub-vector is used for indicating a three-dimensional position of the foot end of the corresponding robotic leg in the robot base coordinate system. Vs includes a foot end velocity sub-vector corresponding to each robotic leg. Any foot end velocity sub-vector is used for indicating a three-dimensional velocity of the foot end of the corresponding robotic leg in the robot base coordinate system. $p_{sx}$ includes a corresponding x-axis directional position sub-vector corresponding to each robotic leg. Any x-axis directional position sub-vector is used for indicating a position of the corresponding robotic leg in the x-axis direction. $p_{sz}$ includes a z directional position sub-vector corresponding to each robotic leg. Any z directional position sub-vector is used for indicating a position of the corresponding robotic leg in the z-axis direction. Then if the position calculation result is divided from the dimensions of the robotic leg, it may be considered that the position calculation result includes a position calculation sub-result of each robotic leg, and the position calculation sub-result of any robotic leg may include a sub-vector corresponding to any robotic leg in each information in the position calculation result.

Next, the position of each robotic leg of the legged robot at the current moment is observed based on the historically obtained state estimation result of the legged robot at the current moment, to obtain a position observation result.

It is to be understood that the state estimation is an iterative process from the instantaneous moment each robotic leg contacts the plane to stability of the legged robot. To be specific, every time a moment arrives, the computer device may obtain corresponding information to estimate a state of the legged robot at a next moment of the moment, thereby obtaining the corresponding state estimation result. Based on this, the state estimation result of the legged robot at the current moment is obtained by estimating the state of the legged robot at the current moment by the computer device when a previous moment of the current moment arrives. In addition, the state estimation result of the legged robot at the current moment may be used as a state vector in a state space observer. In some embodiments, $\hat{x}_{k-1}$ is used to represent a state vector of a $(k-1)^{th}$ time step, and the definition of the state vector may be shown in the following twenty-first equation (21).

$$\hat{x}_{k-1}=\begin{bmatrix} {}_wp_0 \\ {}_wv_0 \\ {}_wp_1 \\ {}_wp_2 \\ {}_wp_3 \\ {}_wp_4 \end{bmatrix} \tag{21}$$

In the twenty-first equation (21), ${}_wp_0$ and ${}_wv_0$ respectively represent a three-dimensional position vector and a three-dimensional velocity vector of the center of mass of the base of the legged robot in the world coordinate system. ${}_{w}p_1$, ${}_{w}p_2$, ${}_{w}p_3$, and ${}_{w}p_4$ respectively represent position vectors of foot ends of four robotic legs of the legged robot in the world coordinate system. It is to be understood that an example in which the legged robot is the quadruped robot is used, and the state vector is exemplarily represented. Therefore, the state vector includes four vectors: $p_1$, $p_2$, $p_3$, and $p_4$. If the legged robot is a robot having another quantity of foots, a quantity of position vectors in the state vector may be adaptively adjusted.

In some embodiments, the computer device may obtain acceleration information of the legged robot at the current moment, and input the acceleration information and the state estimation result of the legged robot at the current moment into the state space observer, so that the state space observer may observe the position of each robotic leg of the legged robot at the current moment based on the acceleration information and the state estimation result of the legged robot at the current moment, to obtain the position observation result. In some embodiments, the state space observer may first use an internal mathematical expression (as shown in the following twenty-second equation (22)), and observe the state of the legged robot at the current moment based on the acceleration information and the state estimation result of the legged robot at the current moment (that is, a $k^{th}$ time step), to obtain the state observation result (represented by $\hat{x}_k$). Then as shown in the following twenty-third equation (23), the position of each robotic leg of the legged robot at the current moment is observed based on the state observation result, to obtain the position observation result ($y_m$).

$$\hat{x}_k = A\hat{x}_{k-1} + B\left({}_{W}a + \begin{bmatrix} 0 \\ 0 \\ -g \end{bmatrix}\right) \tag{22}$$

$$y_m = C\hat{x}_k \tag{23}$$

In the foregoing twenty-second equation (22) and twenty-third equation (23), g represents the acceleration of gravity, a represents the acceleration information, and forms of three matrices A, B, and C may be shown in a twenty-fourth equation (24) to a twenty-sixth equation (26):

$$A = \begin{bmatrix} I_{3\times3} & I_{3\times3}dt & 0_{3\times12} \\ 0_{3\times3} & I_{3\times3} & 0_{3\times12} \\ 0_{12\times3} & 0_{12\times3} & 0_{12\times12} \end{bmatrix} \tag{24}$$

$$B = \begin{bmatrix} \frac{1}{2}I_{3\times3}(dt)^2 \\ I_{3\times3}dt \\ 0_{12\times3} \end{bmatrix} \tag{25}$$

$$C = \begin{bmatrix} C_1 & 0_{12\times3} & -I_{12\times12} \\ 0_{12\times3} & C_2 & 0_{12\times12} \\ 0_{4\times3} & 0_{4\times3} & G_1 \\ 0_{4\times3} & 0_{4\times3} & G_2 \end{bmatrix} \tag{26}$$

where dt represents a time of a control period, I is an identity matrix, 0 represents a zero matrix, and subscripts of I and 0 respectively represent dimensions of the identity matrix and the zero matrix. $C_1$ and $C_2$ correspond to selection matrices in which the corresponding state (that is, the vector in the corresponding dimension) in the state observation result (represented by $\hat{x}k$) is selected as an output $y_m$. $G_1$ and $G_2$ are used for selecting components of vectors such as $p_1$, $p_2$, $p_2 p_3$, and $p_4$ in the x-axis direction and the z-axis direction in the state observation result (represented by $\hat{x}_k$) to form $y_m$.

Next, the computer device determines reference information required for the state estimation. The reference information may be used for indicating a degree of confidence in the position calculation result and the position observation result during the state estimation. The reference information may be a parameter in a Kalman filter, or may be a parameter in the Kalman filter, and may also be a parameter in the state estimation model, which is not limited. For ease of description, an example in which the reference information is the parameter in the EKF is mainly used for subsequent description. In some embodiments, the reference information may include a first parameter and a second parameter. The first parameter indicates the degree of confidence in the position calculation result, and the second parameter indicates the degree of confidence in the position observation result. It may be learned from the foregoing that the position calculation result may include a position calculation sub-result of each robotic leg. Correspondingly, the first parameter may include at least a plurality of target vectors, and different target vectors correspond to different robotic legs. Any target vector is used for indicating a degree of confidence in the position calculation sub-result of the corresponding robotic leg. Similar to the position calculation result, the position observation result may include a position observation sub-result of each robotic leg. The second parameter may also include at least a plurality of reference vectors, and different reference vectors correspond to different robotic legs. Any reference vector is used for indicating a degree of confidence in the position observation sub-result of the corresponding robotic leg.

Practice proves that in terms of the $p_s$ and $v_s$ in the position calculation result outputted by the leg odometer, when a leg of the legged robot does not leave the plane (such as not leaving the ground), accuracy of the calculated $p_s$ and $v_s$ is relatively high. Therefore, a parameter matrix of the EKF needs to be properly selected to implement an increase in the degree of confidence in $p_s$ and $v_s$ when the leg of the legged robot does not leave the plane, that is, an increase in the degree of confidence in the position calculation result.

Next, the state of the legged robot at the next moment of the current moment is estimated based on the reference information, the position calculation result, and the position observation result, to obtain the state estimation result of the legged robot at the next moment.

In some embodiments, if the reference information is the parameter in the EKF, the computer device may perform EKF processing based on the reference information, the position calculation result, and the position observation result, to obtain the state estimation result of the legged robot at the next moment. The process of the EKF processing may include the following twenty-seventh equation (27) to thirty-second (32) equation:

$$y_e = y - y_m; \tag{27}$$

$$P_m = APA^T + Q; \tag{28}$$

$$S = CP_mC^T + R; \tag{29}$$

$$K_k = P_mC^TS^{-1}; \tag{30}$$

$$\dot{x} = K_k y_m; \tag{31}$$

and

-continued $$\hat{x} = \hat{x}_k + \dot{x} \quad (32)$$

In the foregoing twenty-seventh equation (27) to thirty-second equation (32), $y_e$ represents a difference between the position calculation result y and the position observation result $y_m$. For A and C, reference may be made to the relevant descriptions of the twenty-second equation to the twenty-third equation, and $A^T$ and $C^T$ respectively represent a transposed matrix of A and a transposed matrix of C. Q and R are the parameter matrices in the EKF, which respectively correspond to degrees of confidence in different information sources. Q represents a second parameter in the foregoing reference information, and R represents the first parameter in the foregoing reference information. To be specific, R indicates the degree of confidence in the position calculation result y, and Q indicates the degree of confidence in the position observation result ym. P is a preset matrix parameter, $P_m$, S, $K_k$, and $\dot{x}$ all represent intermediate parameters obtained in the EKF process, $S^{-1}$ represents an inverse matrix of S, and $\hat{x}$ represents a state estimation result of the legged robot at the next moment. In addition, after the state estimation result of the legged robot at the next moment is obtained, P may also be updated to facilitate the next EKF processing. For an updated formula of P, reference may be made to the following thirty-third equation (33) and thirty-fourth equation (34):

$$\tilde{P} = (I - P_m C^T S^{-1} C) P_m \quad (33)$$

$$P = \frac{1}{2}(\tilde{P} + \tilde{P}') \quad (34)$$

In the foregoing thirty-third equation (33) and thirty-fourth equation (34), $\tilde{P}$ represents an intermediate parameter obtained in the process of updating P, and $\tilde{P}'$ represents a transposed matrix of $\tilde{P}$.

The foregoing only exemplarily illustrates a specific implementation, and is not exhaustive. For example, if the reference information is the parameter in the Kalman filter, the computer device may perform Kalman filter processing based on the reference information, the position calculation result, and the position observation result, to obtain the state estimation result of the legged robot at the next moment. For another example, if the reference information is a parameter in the state estimation model, the state estimation model may be invoked to estimate the state of the legged robot at the next moment of the current moment based on the reference information, the position calculation result, and the position observation result, to obtain the state estimation result of the legged robot at the next moment.

Finally, the controller determines, based on the state estimation result of the legged robot at the next moment and based on the dynamic model corresponding to the legged robot and the contact force between the plane and each robotic leg of the legged robot at each time step, the motor torque provided by each joint motor at each time step to implement adjustment of the joint torque.

In the embodiments of this application, the state estimation starts to be performed from the stage when four robotic legs all fall onto the ground, to ensure that the state estimation after landing may complete convergence of the results in a very short time. In some embodiments, once the robot detects that all four robotic legs all contact the plane, a state estimator can perform convergence in a short time and calculate an accurate height and pose value of the center of mass based on the joint angle and the leg odometry. The result of real machine measurement indicates that the convergence time is within 0.004-0.01 s, that is, within 2-5 control periods, and the result is desirably applied to a planner of the height and the pose of the center of mass at the moment of landing.

An embodiment of this application further provides an apparatus for controlling the landing of a legged robot on a plane, the legged robot including a base and at least two robotic legs, each of the robotic legs including at least one joint, and the apparatus including: a planning and calculation device, configured to determine a first expected moving trajectory and a second expected moving trajectory corresponding to the legged robot in response to determining that each robotic leg of the legged robot is going to contact a plane, the first expected moving trajectory indicating an expected moving trajectory of a center of mass of the legged robot moving in a direction of gravity and an expected moving trajectory of a change in a tilt angle of the legged robot, and the second expected moving trajectory indicating an expected moving trajectory of a foot end of each robotic leg, the foot end being an end away from the base; and a control motor, configured to control, based on a dynamic model corresponding to the legged robot, the first expected moving trajectory, and the second expected moving trajectory, an action of each joint after the legged robot contacts the plane, until a height of the base of the legged robot is constant and the tilt angle of the legged robot stops changing.

In some embodiments, the at least two robotic legs include at least one front leg and at least one rear leg, and the planning and calculation device is further configured to: determine the first expected moving trajectory corresponding to the legged robot based on an approximate model corresponding to the legged robot in response to determining that each robotic leg of the legged robot is going to contact the plane, in the approximate model, the legged robot being simplified as a single rigid body, and during the contact of the legged robot with the plane, the at least one front leg applying first thrust to the single rigid body, the at least one rear leg applying first thrust to the single rigid body, a resultant force of the first thrust and the second thrust applying upward thrust to the single rigid body, and a torque formed by the first thrust and the second thrust providing an angular acceleration of the center of mass for the single rigid body; determine, at an instantaneous moment each robotic leg contacts the plane, foot end position coordinates of the foot end of each robotic leg at an initial moment, and determine the foot end position coordinates at the initial moment as an initial foot end position; determine foot end position coordinates of the foot end of each robotic leg at a stable moment based on a toppling tendency of each robotic leg when coming into contact with the plane and the initial foot end position, and determine the foot end position coordinates at the stable moment as a terminal foot end position, at the stable moment, a height of the base of the legged robot being constant and the rotation angle in the direction of the tilt angle of the legged robot being zero; and determine, based on the initial foot end position and the terminal foot end position, the second expected moving trajectory corresponding to the legged robot by using cubic spline interpolation.

In some embodiments, the planning and calculation device is further configured to: obtain a mass of the legged robot; determine a dynamic equation corresponding to the legged robot based on the approximate model and the mass of the legged robot; transform the dynamic equation into a state space representation, and discretize the state space representation to obtain a state transition equation corresponding to each time step; and construct an optimized objective function by using the state transition equation corresponding to each time step, and solve the optimized objective function to obtain the first expected moving trajectory corresponding to the legged robot.

In some embodiments, the planning and calculation device is further configured to: obtain offset information corresponding to the toppling tendency of each robotic leg when coming into contact with the plane; and determine the foot end position coordinates of the foot end of each robotic leg at the stable moment based on the initial foot end position and the offset information.

In some embodiments, the planning and calculation device is further configured to: determine a first position component corresponding to the initial foot end position of each robotic leg in a first direction, a second position component corresponding to a second direction, and a third position component corresponding to a third direction, the first direction being a direction corresponding to the toppling tendency, and the second direction and the third direction being other two directions in a world coordinate system other than the first direction; combine the offset information with the first position component corresponding to the initial foot end position of each robotic leg in the toppling tendency, to obtain a first offset position component corresponding to each robotic leg in the first direction; and determine, as the foot end position coordinates of the food end of each robotic leg at the stable moment, the first offset position component corresponding to the first direction, the second position component corresponding to the second direction, and the third position component corresponding to the third direction.

In some embodiments, when the center of mass of the legged robot moves based on the first expected moving trajectory in the direction of gravity, a combination of the following reaches a minimum: a fluctuation quantity of the center of mass of the legged robot, a total quantity of impact forces withstood by the legged robot, a squatting amount of the legged robot, and a sudden change amount of the impact forces withstood by the legged robot.

In some embodiments, the first expected moving trajectory satisfies the following constraints:

- a first constraint, indicating that the impact force withstood by the legged robot at a first instant the legged robot contacts the plane is less than a maximum impact force withstandable by the legged robot;
- a second constraint, indicating that the impact force withstood by the legged robot is less than an upper limit of a support force provided by the plane, and is greater than an upper limit of the support force provided by the plane; and
- a third constraint, indicating that a height of the center of mass of the legged robot is always greater than a minimum height.

In some embodiments, the control motor is further configured to: obtain a toppling tendency of the legged robot at an instantaneous moment each robotic leg contacts the plane; and control each robotic leg of the legged robot to move in a direction of the toppling tendency of the legged robot, and control each robotic leg to gradually rebound from a compressed state until the center of mass of the legged robot reaches an expected resting height and the rotation angle in the direction of the tilt angle of the legged robot is zero.

In some embodiments, the first expected moving trajectory indicates that after each robotic leg of the legged robot contacts the plane, a height of the center of mass of the legged robot in the direction of gravity gradually decreases and then gradually increases, and an angle value of the tilt angle of the legged robot gradually increases and then gradually decreases.

In some embodiments, the dynamic model indicates a relationship between an acceleration of the single rigid body and the first thrust, the second thrust, and the gravity, and the dynamic model further indicates a relationship between an angular acceleration of the single rigid body and the first thrust and the second thrust.

In some embodiments, the control motor is further configured to: determine a contact force between each robotic leg of the legged robot and the plane at each time step based on the dynamic model corresponding to the legged robot, and control an actual trajectory of the center of mass of the legged robot moving in the direction of gravity and an actual trajectory of the change in the tilt angle of the legged robot to be both consistent with the first expected moving trajectory; and determine a motor torque outputted by each joint motor at each time step based on the dynamic model corresponding to the legged robot and the contact force between each robotic leg of the legged robot and the plane at each time step, and control a trajectory of the foot end of each robotic leg to be consistent with the second expected moving trajectory.

In some embodiments, the control motor is further configured to: obtain a particle dynamic equation of the legged robot by using the dynamic model corresponding to the legged robot; and substitute a data sequence corresponding to the first expected moving trajectory into the particle dynamic equation, and apply MPC to solve the contact force between each robotic leg of the legged robot and the plane at each time step.

In some embodiments, the control motor is further configured to: obtain a joint dynamic equation of the legged robot by using the dynamic model corresponding to the legged robot; obtain, from the second expected moving trajectory, an expected foot end position and an expected foot end velocity of each robotic leg of the legged robot at each time step, and obtain an actual foot end position and an actual foot end velocity of each robotic leg of the legged robot at each time step; subtract the corresponding actual foot end position from the expected foot end position of the legged robot at each time step, to obtain a foot end position difference of the legged robot at each time step; subtract the corresponding actual foot end velocity from the expected foot end velocity of the legged robot at each time step, to obtain a foot end velocity difference of the legged robot at each time step; obtain a proportional control feedback coefficient and a differential control feedback coefficient; determine an angular acceleration of each joint by using a data sequence of the proportional control feedback coefficient, the differential control feedback coefficient, the foot end position difference, the foot end velocity difference, and the first expected moving trajectory; and substitute the angular acceleration of each joint and the contact force between each robotic leg of the legged robot and the plane at each time step into the particle dynamic equation to solve the motor torque outputted by each joint motor at each time step.

In some embodiments, the control motor is further configured to: obtain current state information of the legged robot; determine a robotic leg state of each robotic leg of the legged robot based on the current state information of the legged robot, the robotic leg state being a compressed state or a rebound state; and obtain the proportional control feedback coefficient and the differential control feedback coefficient corresponding to the robotic leg state of each robotic leg.

In some embodiments, the planning and calculation device is further configured to: obtain current state information of the legged robot; determine contact information between each robotic leg and the plane at a current moment based on the current state information of the legged robot; and determine, in response to determining that each robotic leg is in contact with the plane at the current moment based on the contact information between each robotic leg and the plane at the current moment, that each robotic leg of the legged robot is going to contact the plane.

In some embodiments, the current state information includes at least one of the following:

a joint motor torque or a current value or a voltage value of each robotic leg;

a height of the center of mass, a pose of the center of mass, and current joint angle information corresponding to each robotic leg of the legged robot;

a current plantar tactile feedback value corresponding to each robotic leg; and a current acceleration of the legged robot in the direction of gravity.

Figure 9:
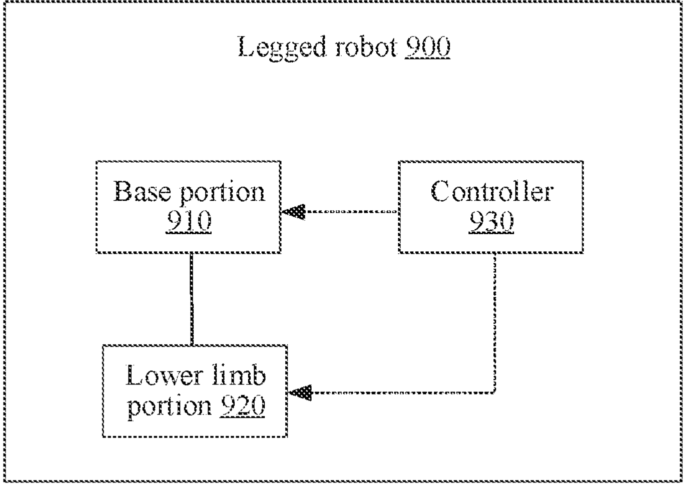
FIG. 9 is an exemplary block diagram showing a legged robot according to an embodiment of this application.

An embodiment of this application provides a legged robot 900. FIG. 9 is an exemplary block diagram showing a legged robot 900 according to an embodiment of this application.

The legged robot 900 may include a base portion 910 and a lower limb portion 920 connected to the base portion. The lower limb portion 920 may include four lower limbs, and each of the lower limbs may include a hip joint having two degrees of freedom and a knee joint having one degree of freedom.

The lower limb portion refers to a foot component of the legged robot for implementing motion, including, for example, a robotic leg and a motor connecting the robotic leg to the base and configured to implement motion control of the robotic leg. The embodiments of this application are not limited by a specific composition type of the lower limb portion and a quantity of lower limbs.

The base refers to a main body part of the legged robot. For example, the base may be a trunk portion of the legged robot, and the embodiments of this application are not limited by a specific shape and composition of the base portion.

In some embodiments, the base portion includes, for example, 2 spinal joints, and the lower limb may include, for example, 8 lower limb joints. The embodiments of this application are not limited by a specific quantity of joints included in the base portion and the lower limb portion, and are not limited by a specific joint configuration of the legged robot.

The legged robot may further include a controller 930. The controller is arranged on the legged robot, can perform the foregoing motion control method, and has the foregoing functions.

The controller includes, for example, a processing apparatus. The processing apparatus may include a microprocessor, a digital signal processor (DSP), an application-specific integrated circuit (ASIC), a field programmable gate array, a state machine, or another processing device for processing an electrical signal received from a sensor line. The processing device may include a programmable electronic device, for example, a PLC, a programmable interrupt controller (PIC), a programmable logic device (PLD), a programmable read-only memory (PROM), and an electronic programmable read-only memory.

In addition, the legged robot may further include a bus, a memory, a sensor assembly, a communication module, an input/output apparatus, and the like.

The bus may be a circuit that interconnects components of the legged robot and transmits communication information (for example, control messages or data) among the components.

The sensor assembly may be configured to perceive the physical world, including, for example, a camera, an infrared sensor, and an ultrasonic sensor. In addition, the sensor assembly may further include an apparatus for measuring a current operation and motion state of the legged robot, for example, a Hall sensor, a laser position sensor, or a strain force sensor.

The communication module may be connected to a network, for example, in a wired or wireless manner, to facilitate communication with the physical world (for example, a server). The communication module may be wireless and may include a wireless interface, for example, an IEEE 802.11 interface, a Bluetooth interface, a wireless local area network (WLAN) transceiver, or a radio interface for accessing a cellular telephone network (for example, a transceiver/an antenna for accessing CDMA, GSM, UMTS, or another mobile communication network). In another example, the communication module may be wired and may include an interface such as an Ethernet interface, a USB interface, or an IEEE 1394 interface.

The input/output apparatus may, for example, transmit an instruction or data inputted from a user or any other external device to one or more other components of the legged robot, or may output, to a user or another external device, an instruction or data received from one or more other components of the legged robot.

A plurality of legged robots may constitute a legged robot system to collaboratively complete a task. The plurality of legged robots are communicatively connected to a server, and receive an instruction for collaboration with the legged robot from the server.

According to an aspect of the embodiments of this application, a device for controlling the landing of a legged robot on a plane is provided. The device for controlling the landing of a legged robot on a plane includes a processor and a memory, the memory storing at least one instruction, at least one program, a code set, or an instruction set, the at least one instruction, the at least one program, the code set, or the instruction set being loaded and executed by the processor to implement the foregoing method.

According to an aspect of the embodiments of this application, a computer-readable storage medium is provided, having at least one instruction, at least one program, a code set, or an instruction set stored therein, the at least one instruction, the at least one program, the code set, or the instruction set being loaded and executed by a processor to implement the foregoing method.

An embodiment of this application provides a computer program product, including a computer-executable instruction or a computer program, the computer-executable instruction or the computer program, when executed by a processor, implementing the method for controlling the landing of a legged robot on a plane provided in the embodiments of this application.

The program part of the technology may be considered as a "product" or "artifact" existing in the form of executable code and/or related data, which is involved in or implemented through a computer-readable medium. A tangible and permanent storage medium may include an internal memory or a memory used by any computer, processor, or similar device, or related module, for example, various semiconductor memories, tape drives, disk drives, or any similar device capable of providing storage functions for software.

All or a part of the software may sometimes communicate over a network, such as the Internet or another communication network. The software may be loaded from a computer device or a processor to another through such communication. Therefore, another medium capable of transferring a software element may alternatively be used for physical connection between local devices. For example, a light wave, a radio wave, an electromagnetic wave, and the like are propagated through cables, optical cables, air, and the like. The physical medium for carrying waves, for example, a similar device such as a cable, a wireless connection, or an optical cable, may alternatively be considered as a medium that carries the software. Unless the usage herein limits a tangible "storage" medium, another term that represents a computer- or machine- "readable medium" represents a medium involved during execution of any instruction by a processor.

Specific terms are used in this application to describe the embodiments of this application. For example, "a first/second embodiment", "an embodiment", and/or "some embodiments" mean specific features, structures, or characteristics related to at least one embodiment of this application. Therefore, "an embodiment" or "one embodiment" or "an alternative embodiment" mentioned twice or a plurality of times at different locations in this specification does not necessarily refer to the same embodiment. In addition, some features, structures, or characteristics of one or more embodiments of this application may be properly combined.

In addition, it is understood by a person skilled in the art that all aspects of this application may be illustrated and described by using several categories or circumstances, including any new and useful combination of processes, machines, products, or substances, or any new and useful improvement thereof. Accordingly, all aspects of this application may be completely executed by hardware, may be completely executed by software (including firmware, resident software, microcode, and the like), or may be executed by a combination of hardware and software. The foregoing hardware or software may be referred to as "data block", "module", "engine", "unit", "component", or "system". In addition, various aspects of this application may be embodied as a computer product located in one or more computer-readable media, the product including computer-readable program code.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. Unless otherwise defined, all terms (including technical and scientific terms) used herein have the same meaning as commonly understood by a person of ordinary skill in the art to which the present invention belongs. It is further to be understood that, the terms such as those defined in commonly used dictionaries are to be interpreted as having meanings that are consistent with the meanings in the context of the related art, and are not to be interpreted in an idealized or extremely formalized sense, unless explicitly defined in this way herein.

The foregoing is description of the present invention, and not to be considered as a limitation on the present invention. Although several exemplary embodiments of the present invention are described, a person skilled in the art may easily understand that, many modifications may be made to the exemplary embodiments without departing from novel teaching and advantages of the present invention. Therefore, all such modifications are intended to be included within the scope of the present invention defined by the claims. It is to be understood that, the foregoing is the descriptions of the present invention, and is not to be considered to be limited by the disclosed specific embodiments, and modifications to the disclosed embodiments and other embodiments are intended to be included within the scope of the appended claims. The present invention is subject to the claims and equivalents thereof.

What is claimed is:

1. A method for controlling the landing of a legged robot on a plane performed by a computer device, the legged robot comprising a base and at least two robotic legs, each of the robotic legs comprising at least one joint, the method comprising:

determining a first expected moving trajectory and a second expected moving trajectory and a third expected moving trajectory, each corresponding to a respective portion of the legged robot in response to determining an instantaneous moment that each robotic leg of the legged robot contacts the plane, the first expected moving trajectory indicating an expected moving trajectory of a center of mass of the legged robot, the second expected moving trajectory indicating an expected moving trajectory of a foot end of each robotic leg, and the third expected moving trajectory indicating an expected moving trajectory of a change in a tilt angle of the legged robot; and controlling, based on a dynamic model corresponding to the legged robot, the first expected moving trajectory, the second expected moving trajectory, and the third expected moving trajectory, an action of each joint after the legged robot contacts the plane, until a height of the base of the legged robot reaches a constant value and the tilt angle of the legged robot stops changing, wherein the controlling the action of each joint after the legged robot contacts the plane comprises:

obtaining a toppling direction of the legged robot and offset information corresponding to the toppling direction of each robotic leg at the instantaneous moment that each robotic leg contacts the plane;

determining a first position component corresponding to an initial foot end position of each robotic leg in the toppling direction of the legged robot;

combining the offset information with the first position component corresponding to the initial foot end position of each robotic leg in the toppling direction, to obtain a first offset position component corresponding to each robotic leg in the toppling direction;

controlling each robotic leg of the legged robot to move along the toppling direction of the legged robot by the first offset position component into a compressed state; and controlling each robotic leg to rebound from the compressed state to a rebound state until the center of mass of the legged robot reaches an expected resting height and a rotation angle in the direction of the tilt angle of the legged robot is zero.

2. The method according to claim 1, wherein the at least two robotic legs comprise at least one front leg and at least one rear leg, and the determining the first expected moving trajectory and the second expected moving trajectory corresponding to the legged robot in response to determining, at the instantaneous moment, that each robotic leg of the legged robot contacts the plane comprises:

determining the first expected moving trajectory corresponding to the center of mass of the legged robot and the third expected moving trajectory corresponding to the tilt angle of the legged robot based on an approximate model corresponding to the legged robot in response to determining, at the instantaneous moment, that each robotic leg of the legged robot contacts the plane, in the approximate model, the legged robot being a single rigid body, and during the contact of the legged robot with the plane, the at least one front leg applying first thrust to the single rigid body, the at least one rear leg applying second thrust to the single rigid body, a resultant force of the first thrust and the second thrust applying upward thrust to the single rigid body, and a torque formed by the first thrust and the second thrust providing an angular acceleration of the center of mass for the single rigid body;

determining, at the instantaneous moment each robotic leg contacts the plane, foot end position coordinates of the foot end of each robotic leg at an initial moment, and determining the foot end position coordinates at the initial moment as the initial foot end position;

determining foot end position coordinates of the foot end of each robotic leg at a stable moment based on a toppling tendency of each robotic leg in a case of coming into contact with the plane and the initial foot end position, and determining the foot end position coordinates at the stable moment as a terminal foot end position, at the stable moment, the height of the base of the legged robot being the constant value and the rotation angle in the direction of the tilt angle of the legged robot being zero; and determining, based on the initial foot end position and the terminal foot end position, the second expected moving trajectory corresponding to the foot end of each robotic leg of the legged robot by using cubic spline interpolation.

3. The method according to claim 2, wherein the determining the first expected moving trajectory corresponding to the center of mass of the legged robot based on the approximate model corresponding to the legged robot comprises:

obtaining a mass of the legged robot;

determining a dynamic equation corresponding to the legged robot based on the approximate model and the mass of the legged robot;

transforming the dynamic equation into a state space representation, and discretizing the state space representation to obtain a state transition equation corresponding to each time step; and constructing an optimized objective function by using the state transition equation corresponding to each time step, and solving the optimized objective function to obtain the first expected moving trajectory corresponding to the center of mass of the legged robot.

4. The method according to claim 2, wherein the determining foot end position coordinates of the foot end of each robotic leg at the stable moment based on the toppling tendency of each robotic leg in the case of coming into contact with the plane and the initial foot end position comprises:

obtaining the offset information corresponding to the toppling tendency of each robotic leg in a case of coming into contact with the plane; and determining the foot end position coordinates of the foot end of each robotic leg at the stable moment based on the offset information corresponding to the toppling tendency of each robotic leg in a case of coming into contact with the plane and the initial foot end position of each robotic leg.

5. The method according to claim 2, wherein when the center of mass of the legged robot moves along the first expected moving trajectory in the direction of gravity, a combination of the following reaches a minimum: a fluctuation quantity of the center of mass of the legged robot, a total quantity of impact forces withstood by the legged robot, a squatting amount of the legged robot, and a change amount of the impact forces withstood by the legged robot.

6. The method according to claim 1, wherein the first expected moving trajectory indicates that after each robotic leg of the legged robot contacts the plane, a height of the center of mass of the legged robot in the direction of gravity decreases first and then increases, and an angle value of the tilt angle of the legged robot increases first and then decreases.

7. The method according to claim 2, wherein the dynamic model indicates a relationship between an acceleration of the single rigid body and the first thrust, the second thrust, and the gravity, and the dynamic model further indicates a relationship between an angular acceleration of the single rigid body and the first thrust and the second thrust.

8. The method according to claim 2, wherein the controlling, based on the dynamic model corresponding to the legged robot, the first expected moving trajectory, the second expected moving trajectory, and the third expected moving trajectory, the action of each joint after the legged robot contacts the plane comprises:

determining a contact force between each robotic leg of the legged robot and the plane at each time step based on the dynamic model corresponding to the legged robot and the first expected moving trajectory, and controlling an actual trajectory of the center of mass of the legged robot moving in the direction of gravity consistent with the first expected moving trajectory, and controlling an actual trajectory of the change in the tilt angle of the legged robot consistent with the third expected moving trajectory; and determining a motor torque outputted by each joint motor at each time step based on the dynamic model corresponding to the legged robot, the contact force between each robotic leg of the legged robot and the plane at each time step, and the second expected moving trajectory, and controlling a trajectory of the foot end of each robotic leg to be consistent with the second expected moving trajectory.

9. The method according to claim 1, wherein the determining the instantaneous moment that each robotic leg of the legged robot contacts the plane comprises:

obtaining current state information of the legged robot;

determining contact information between each robotic leg and the plane at a current moment based on the current state information of the legged robot; and determining, in response to determining that each robotic leg is in contact with the plane at the current moment based on the contact information between each robotic leg and the plane at the current moment, the current moment as the instantaneous moment that each robotic leg of the legged robot contacts the plane.

10. A computer device for controlling the landing of a legged robot on a plane, the legged robot comprising a base and at least two robotic legs, each of the robotic legs comprising at least one joint, the computer device comprising:

a processor; and a memory, having a computer-executable code stored therein, the computer-executable code, when executed by the processor, performing a method including:

determining a first expected moving trajectory and a second expected moving trajectory and a third expected moving trajectory, each corresponding to a respective portion of the legged robot in response to determining an instantaneous moment that each robotic leg of the legged robot contacts the plane, the first expected moving trajectory indicating an expected moving trajectory of a center of mass of the legged robot, the second expected moving trajectory indicating an expected moving trajectory of a foot end of each robotic leg, and the third expected moving trajectory indicating an expected moving trajectory of a change in a tilt angle of the legged robot; and controlling, based on a dynamic model corresponding to the legged robot, the first expected moving trajectory, the second expected moving trajectory, and the third expected moving trajectory, an action of each joint after the legged robot contacts the plane, until a height of the base of the legged robot reaches a constant value and the tilt angle of the legged robot stops changing, wherein the controlling the action of each joint after the legged robot contacts the plane comprises:

obtaining a toppling direction of the legged robot and offset information corresponding to the toppling direction of each robotic leg at the instantaneous moment that each robotic leg contacts the plane;

determining a first position component corresponding to an initial foot end position of each robotic leg in the toppling direction of the legged robot;

combining the offset information with the first position component corresponding to the initial foot end position of each robotic leg in the toppling direction, to obtain a first offset position component corresponding to each robotic leg in the toppling direction;

controlling each robotic leg of the legged robot to move along the toppling direction of the legged robot by the first offset position component into a compressed state; and controlling each robotic leg to rebound from the compressed state to a rebound state until the center of mass of the legged robot reaches an expected resting height and a rotation angle in the direction of the tilt angle of the legged robot is zero.

11. The computer device according to claim 10, wherein the at least two robotic legs comprise at least one front leg and at least one rear leg, and the determining the first expected moving trajectory and the second expected moving trajectory corresponding to the legged robot in response to determining, at the instantaneous moment, that each robotic leg of the legged robot contacts the plane comprises:

determining the first expected moving trajectory corresponding to the center of mass of the legged robot and the third expected moving trajectory corresponding to the tilt angle of the legged robot based on an approximate model corresponding to the legged robot in response to determining, at the instantaneous moment, that each robotic leg of the legged robot contacts the plane, in the approximate model, the legged robot being a single rigid body, and during the contact of the legged robot with the plane, the at least one front leg applying first thrust to the single rigid body, the at least one rear leg applying second thrust to the single rigid body, a resultant force of the first thrust and the second thrust applying upward thrust to the single rigid body, and a torque formed by the first thrust and the second thrust providing an angular acceleration of the center of mass for the single rigid body;

determining, at the instantaneous moment each robotic leg contacts the plane, foot end position coordinates of the foot end of each robotic leg at an initial moment, and determining the foot end position coordinates at the initial moment as the initial foot end position;

determining foot end position coordinates of the foot end of each robotic leg at a stable moment based on a toppling tendency of each robotic leg in a case of coming into contact with the plane and the initial foot end position, and determining the foot end position coordinates at the stable moment as a terminal foot end position, at the stable moment, the height of the base of the legged robot being the constant value and the rotation angle in the direction of the tilt angle of the legged robot being zero; and determining, based on the initial foot end position and the terminal foot end position, the second expected moving trajectory corresponding to the foot end of each robotic leg of the legged robot by using cubic spline interpolation.

12. The computer device according to claim 11, wherein the determining the first expected moving trajectory corresponding to the center of mass of the legged robot based on the approximate model corresponding to the legged robot comprises:

obtaining a mass of the legged robot; determining a dynamic equation corresponding to the legged robot based on the approximate model and the mass of the legged robot;

transforming the dynamic equation into a state space representation, and discretizing the state space representation to obtain a state transition equation corresponding to each time step; and constructing an optimized objective function by using the state transition equation corresponding to each time step, and solving the optimized objective function to obtain the first expected moving trajectory corresponding to the center of mass of the legged robot.

13. The computer device according to claim 11, wherein the determining foot end position coordinates of the foot end of each robotic leg at the stable moment based on the toppling tendency of each robotic leg in the case of coming into contact with the plane and the initial foot end position comprises:

obtaining the offset information corresponding to the toppling tendency of each robotic leg in a case of coming into contact with the plane; and determining the foot end position coordinates of the foot end of each robotic leg at the stable moment based on the offset information corresponding to the toppling tendency of each robotic leg in a case of coming into contact with the plane and the initial foot end position of each robotic leg.

14. The computer device according to claim 11, wherein when the center of mass of the legged robot moves along the first expected moving trajectory in the direction of gravity, a combination of the following reaches a minimum: a fluctuation quantity of the center of mass of the legged robot, a total quantity of impact forces withstood by the legged robot, a squatting amount of the legged robot, and a change amount of the impact forces withstood by the legged robot.

15. The computer device according to claim 10, wherein the first expected moving trajectory indicates that after each robotic leg of the legged robot contacts the plane, a height of the center of mass of the legged robot in the direction of gravity decreases first and then increases, and an angle value of the tilt angle of the legged robot increases first and then decreases.

16. The computer device according to claim 11, wherein the dynamic model indicates a relationship between an acceleration of the single rigid body and the first thrust, the second thrust, and the gravity, and the dynamic model further indicates a relationship between an angular acceleration of the single rigid body and the first thrust and the second thrust.

17. The computer device according to claim 11, wherein the controlling, based on the dynamic model corresponding to the legged robot, the first expected moving trajectory, the second expected moving trajectory, and the third expected moving trajectory, the action of each joint after the legged robot contacts the plane comprises:

determining a contact force between each robotic leg of the legged robot and the plane at each time step based on the dynamic model corresponding to the legged robot and the first expected moving trajectory, and controlling an actual trajectory of the center of mass of the legged robot moving in the direction of gravity consistent with the first expected moving trajectory, and controlling an actual trajectory of the change in the tilt angle of the legged robot consistent with the third expected moving trajectory; and determining a motor torque outputted by each joint motor at each time step based on the dynamic model corresponding to the legged robot, the contact force between each robotic leg of the legged robot and the plane at each time step, and the second expected moving trajectory, and controlling a trajectory of the foot end of each robotic leg to be consistent with the second expected moving trajectory.

18. A non-transitory computer-readable storage medium, having an executable code stored therein, the executable code, when executed by a processor of a computer device, causing the computer device to perform a method for controlling the landing of a legged robot on a plane, the legged robot comprising a base and at least two robotic legs, each of the robotic legs comprising at least one joint, the method comprising:

determining a first expected moving trajectory and a second expected moving trajectory and a third expected moving trajectory, each corresponding to a respective portion of the legged robot in response to determining an instantaneous moment that each robotic leg of the legged robot contacts the plane, the first expected moving trajectory indicating an expected moving trajectory of a center of mass of the legged robot, the second expected moving trajectory indicating an expected moving trajectory of a foot end of each robotic leg, and the third expected moving trajectory indicating an expected moving trajectory of a change in a tilt angle of the legged robot; and controlling, based on a dynamic model corresponding to the legged robot, the first expected moving trajectory, the second expected moving trajectory, and the third expected moving trajectory, an action of each joint after the legged robot contacts the plane, until a height of the base of the legged robot reaches a constant value and the tilt angle of the legged robot stops changing, wherein the controlling the action of each joint after the legged robot contacts the plane comprises:

obtaining a toppling direction of the legged robot and offset information corresponding to the toppling direction of each robotic leg at the instantaneous moment that each robotic leg contacts the plane;

determining a first position component corresponding to an initial foot end position of each robotic leg in the toppling direction of the legged robot;

combining the offset information with the first position component corresponding to the initial foot end position of each robotic leg in the toppling direction, to obtain a first offset position component corresponding to each robotic leg in the toppling direction;

controlling each robotic leg of the legged robot to move along the toppling direction of the legged robot by the first offset position component into a compressed state; and controlling each robotic leg to rebound from the compressed state to a rebound state until the center of mass of the legged robot reaches an expected resting height and a rotation angle in the direction of the tilt angle of the legged robot is zero.

* * * * *